(12) United States Patent
Ichikawa et al.

(10) Patent No.: US 6,908,422 B2
(45) Date of Patent: Jun. 21, 2005

(54) RECLOSABLE PACKAGING BAG AND METHOD FOR MANUFACTURING SAME

(75) Inventors: Tooru Ichikawa, Misato (JP); Kazunori Fujino, Tokyo-to (JP); Raizo Kuge, Hanno (JP); Masahiro Ito, Tokyo-to (JP); Graham Houlder, Vlaardingen (NL); Hirokazu Suzuki, Tokyo-to (JP); John S. K. Cheah, Epping (AU)

(73) Assignees: Hosokawa Yoko Co., Ltd., Tokyo-To (JP); Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/799,809

(22) Filed: Mar. 7, 2001

(65) Prior Publication Data

US 2001/0029226 A1 Oct. 11, 2001

(30) Foreign Application Priority Data

Mar. 7, 2000 (JP) .................................... P2000-061526
Jul. 18, 2000 (JP) .................................... P2000-217073

(51) Int. Cl.$^7$ .............................................. B31B 41/64
(52) U.S. Cl. ...................... 493/186; 493/213; 493/217; 493/243; 493/267; 53/139.2; 383/119
(58) Field of Search ................................ 493/186, 213, 493/217, 243, 267, 394, 927; 53/394, 139.2; 229/164.1; 383/119

(56) References Cited

U.S. PATENT DOCUMENTS

| | | | | |
|---|---|---|---|---|
| 2,331,966 A | * | 10/1943 | Eisgrau | 383/104 |
| 2,802,617 A |   | 8/1957  | Roper   |         |
| 2,815,898 A | * | 12/1957 | Thompson | 383/104 |
| 4,110,953 A | * | 9/1978  | Holmes  | 53/419  |
| 4,115,909 A | * | 9/1978  | Corella | 229/48  |
| 4,568,017 A |   | 2/1986  | Grunert |         |
| 4,622,693 A | * | 11/1986 | Mykleby | 383/119 |
| 4,829,745 A | * | 5/1989  | Behr et al. | 53/451 |
| 4,878,987 A |   | 11/1989 | Ven Erden |        |
| 4,900,163 A | * | 2/1990  | Mack    | 383/119 |
| 4,979,547 A | * | 12/1990 | Hoerner | 141/390 |
| 5,028,147 A | * | 7/1991  | Graham  | 383/119 |
| 5,140,727 A |   | 8/1992  | Dais et al. |     |
| 5,165,568 A | * | 11/1992 | Wischusen, III | 229/164.1 |
| 5,384,942 A | * | 1/1995  | Siegel  | 24/585.12 |
| 5,398,387 A | * | 3/1995  | Torigoe et al. | 24/452 |
| 5,415,904 A |   | 5/1995  | Takubo et al. |    |
| 5,461,845 A |   | 10/1995 | Yeager  |         |

(Continued)

FOREIGN PATENT DOCUMENTS

| | | |
|---|---|---|
| AU | 28158/99 | 12/1999 |
| DE | 2 780 913 | 1/2000 |
| EP | 0 510 797 A1 | 10/1992 |
| WO | 00/76877 A1 | 12/2000 |

*Primary Examiner*—Scott A. Smith
*Assistant Examiner*—Gloria R. Weeks
(74) *Attorney, Agent, or Firm*—Nixon & Vanderhye P.C.

(57) ABSTRACT

A reclosable packaging bag comprises a main bag body having an opening portion and at least one heat-sealed portion; and a linear fastener provided on the opening portion of the main bag body. The linear fastener is provided along the opening portion of the main bag body by an insert injection molding so as not to extend to the heat-sealed portions. A method for manufacturing the bag comprises the three steps. First, the first and second linear fastening members are formed on a prescribed position of a sheet of film material by an insert injection molding so as to be spaced from each other. These fastening members are engageable with each other to form a linear fastener. Second, the sheet of film material is folded in two so that the fastening members can engage with each other. Third, each of opposite portions of the sheet of film material thus folded is heat-sealed to form side heat-sealed portions.

19 Claims, 19 Drawing Sheets

U.S. PATENT DOCUMENTS

| | | | | |
|---|---|---|---|---|
| 5,519,982 A | * | 5/1996 | Herber et al. | 53/412 |
| 5,609,420 A | | 3/1997 | Palmisano | |
| 5,762,260 A | * | 6/1998 | Goglio | 229/199 |
| 5,788,378 A | * | 8/1998 | Thomas | 383/63 |
| 5,875,611 A | * | 3/1999 | Plourde | 53/412 |
| 6,021,624 A | * | 2/2000 | Richison et al. | 53/410 |
| 6,029,428 A | * | 2/2000 | Terminella et al. | 53/551 |
| 6,131,369 A | * | 10/2000 | Ausnit | 53/412 |
| 6,334,710 B1 | * | 1/2002 | Kuge et al. | 383/104 |
| 6,350,340 B1 | * | 2/2002 | Johnson | 156/252 |
| 6,367,128 B1 | * | 4/2002 | Galkiewicz et al. | 24/585.1 |
| 6,599,227 B1 | * | 7/2003 | Kettner | 493/394 |
| 6,605,026 B1 | * | 8/2003 | Tomic | 493/394 |

* cited by examiner

RECLOSABLE PACKAGING BAG AND METHOD FOR MANUFACTURING SAME

BACKGROUND OF THE INVENTION

1. Field of the Invention

The present invention relates to a packaging bag that can be reopened and reclosed, and a method for manufacturing such a reclosable packaging bag.

2. Description of the Related Art

A reclosable packaging bag 1, which has conventionally been used, comprises a main bag body 7 and a linear fastener 9 as shown in FIG. 25. The main bag body 7 is formed by placing two sheets of plastic film material 2, 3 one upon another and heat-sealing the opposite side edges and the lower edge of them so that the main bag body 7 has an upper opening portion 8 and heat-sealed portions 4, 5, 6. The linear fastener 9 is provided on the inner surface of the opening portion 8 of the main bag body 7. The opening edge of the reclosable packaging bag 1 is closed by subjecting the opening edge to a heat sealing process after filling the bag 1 with the contents. The linear fastener 9 is composed of a fastening member having a male-engaging portion and the other fastening member having a female-engaging portion.

With respect to the manufacturing method of the above-mentioned reclosable packaging bag, the linear fastener 9 is cut off to a length, which is identical to the width of the sheets of plastic film material 2, 3, in order to provide the main bag body 7 with the linear fastener 9. The one fastening member of the linear fastener 9 thus cut is temporarily bonded on the inner surface of the one edge of the sheet 2. The other fastening member of the linear fastener 9 thus cut is temporarily bonded on the inner surface of the one edge of the sheet 3. The heat-sealing process, which is applied to the sheets 2, 3 to form the main bag body 7, causes the fastening members of the linear fastener 9 to be secured firmly on the inner surface of the main bag body 7.

In the above-mentioned conventional reclosable packaging bag, the linear fastener 9 extends continuously from the outer edge of the heat-sealed portion locating on the one side of the main bag body to the outer edge of the heat-sealed portion locating on the other side of the main bag body. Consequently, each of both side portions of the main bag body has a thickness, which is identical to the total of the thickness of the two sheets and the thickness of the fastening members. There is required enough pressure and quantity of heat by which the fastening members can be melted and deformed, when applying the heat-sealing process to the opposite sides of the main bag body. A required period of time for the heat-sealing process is therefore extended.

The step for cutting off the linear fastener to the length, which is identical to the width of the sheets of plastic film material, and the step for bonding the fastening members for the linear fastener on the inner surfaces of the sheets of plastic film material are essential to the method for manufacturing the above-mentioned reclosable packaging bag. Improvement in processing efficiency may be restricted.

In general, the reclosable packaging bag has so small rigidity that the reclosable packaging bags receiving the contents cannot be exhibited as merchandise in a stacked state.

SUMMARY OF THE INVENTION

An object of the present invention, which was made in view of the above-described problems, is to provide a reclosable packaging bag and a method for manufacturing such a bag, which permit to reduce the period of time for process and improve the processing efficiency.

Another object of the present invention is to provide a reclosable packaging bag, which is stackable.

In order to solve the object concerning the period of time for process and the processing efficiency, a reclosable packaging bag of the present invention comprises:

a main bag body having an opening portion and at least one heat-sealed portion; and a linear fastener provided on said opening portion of said main bag body, wherein:

said linear fastener is provided along said opening portion of said main bag body by an insert injection molding so as not to extend to said heat-sealed portions.

The heat sealed portion may be provided on each of opposite sides of said main bag body.

The heat sealed portion may be provided on one of a pair of opposing faces of said main bag body.

The heat-sealed portion may be provided on a middle portion of said one of said pair of opposing faces.

The reclosable packaging bag may comprise a sleeve, which is placed in said main bag body to keep a prescribed shape thereof.

The sleeve may be foldable.

The sleeve may have a pair of projections each having a triangular shape, said pair of projections being capable of coming into contact with a bottom of said main bag body and being foldable.

The sleeve may have at least one bendable reinforcement flap, which locates in a vicinity of said opening portion of said main bag body.

The sleeve may have a detachable sleeve portion that is accessible when the reclosable packaging bag is opened and which when detached enables the sleeve to relax from said prescribed three-dimensional shape.

Finger-holes may be formed in said detachable sleeve portion to facilitate its removal.

The main bag body may be folded into a prescribed shape; and the linear fastener may have easily bendable portions, which facilitates the folding of said main bag body.

The linear fastener may have a female-fastening member and a male-fastening member engageable therewith, and said easily bendable portions may comprise flat portions, which are formed by removing partially said female-fastening member and said male-fastening member.

The flat portions may have auxiliary sealing means, said auxiliary sealing means being capable of coming into contact with each other to seal a space between said flat portions.

The main bag body may have at least one stopper portion for positioning said sleeve.

In order to solve the object concerning the stackable property, a reclosable packaging bag of the present invention comprises:

a main bag body having an opening portion and at least one heat-sealed portion; and a linear fastener provided on said opening portion of said main bag body, wherein:

said reclosable packaging bag further comprises a sleeve, which is placed in said main bag body, said main bag body being folded into a prescribed three-dimensional shape defined by said sleeve so as to keep said prescribed three-dimensional shape.

In order to solve the object concerning the period of time for process and the processing efficiency, a method of the present invention for manufacturing the reclosable packaging bag comprises the steps of:

forming first and second linear fastening members on a prescribed position of a sheet of film material by an insert injection molding so as to be spaced from each other, said first and second linear fastening members being engageable with each other to form a linear fastener;

folding said sheet of film material having said first and second linear fastening members formed thereon in two so that said first and second linear fastening members can engage with each other; and heat-sealing each of opposite portions of said sheet of film material thus folded to form side heat-sealed portions.

In order to solve the object concerning the period of time for process and the processing efficiency, another method of the present invention for manufacturing the reclosable packaging bag comprises the steps of:

continuously forming first and second linear fastening members on a prescribed position of a rolled strip of film material by an insert injection molding so as to be spaced from each other, said first and second linear fastening members being engageable with each other to form a linear fastener;

cutting said rolled strip of film material into a separately independent sheet of film material;

folding said sheet of film material having said first and second linear fastening members formed thereon in two so that said first and second linear fastening members can engage with each other; and heat-sealing each of opposite portions of said sheet of film material thus folded to form side heat-sealed portions.

The linear fastener may continuously be formed on said sheet of film material so as not to extend to said heat-sealed portions.

In order to solve the object concerning the period of time for process and the processing efficiency, a further another method of the present invention for manufacturing the reclosable packaging bag comprises the steps of:

folding a single sheet of film material in two to prepare a non-joined main bag body, upper and opposite side edges of which have not as yet been joined with each other;

folding upper portions of said non-joined main bag body so as to be separate from each other to form a pair of bent portions;

placing said pair of bent portions in a linear-fastener molding machine;

continuously forming fist and second linear fastening members for a linear fastener on inner surfaces of said pair of bent portions of said main body by an insert injection molding, respectively, excluding opposite side edges thereof; and heat-sealing said opposite side edges of said non-joined main bag body over their entirety.

In order to solve the object concerning the period of time for process and the processing efficiency, a still further another method of the present invention for manufacturing the reclosable packaging bag comprises the steps of:

folding a single sheet of film material in two to prepare a non-joined main bag body, upper and lower edges and one of opposite side edges of which have not as yet been joined with each other.;

forming a cut-out on an upper end of the other of said opposite side edges of said non-joined main bag body;

folding upper portions of said non-joined main bag body so as to be separate from each other to form a pair of bent portions, said upper portions having a length corresponding to a length of said cut-out;

placing said pair of bent portions in a linear-fastener molding machine;

continuously forming fist and second linear fastening members for a linear fastener on inner surfaces of said pair of bent portions of said non-joined main bag body by an insert injection molding, respectively, excluding opposite side edges thereof; and heat-sealing said lower edge and said one of opposite side edges of said non-joined main bag body over their entirety and heat-sealing only said upper end of said other of said opposite side edges of said non-joined main bag body.

In order to solve the object concerning the period of time for process and the processing efficiency, a still further another method of the present invention for manufacturing the reclosable packaging bag comprises the steps of:

placing opposite edges of a single sheet of film material one upon another and heat-sealing overlapping portions of said single sheet of film material over their entirety in a longitudinal direction to form a heat-sealed portion, so as to prepare a non-joined main bag body, upper and lower ends are opened;

folding said non-joined main bag body in a flat state so that said heat sealed portion locates apart from one of opposite side edges of said non-joined main bag body by a prescribed distance;

forming cut-outs on upper ends of said opposite side edges of said non-joined main bag body;

folding upper portions of said non-joined main bag body so as to be separate from each other to form a pair of bent portions, said upper portions having a length corresponding to a length of said cut-out;

placing said pair of bent portions in a linear-fastener molding machine;

continuously forming fist and second linear fastening members for a linear fastener on inner surfaces of said pair of bent portions of said non-joined main bag body by an insert injection molding, respectively, excluding opposite side edges thereof; and heat-sealing a lower edge of said non-joined main bag body over its entirety and heat-sealing only said upper ends of said opposite side edges of said non-joined main bag body.

In order to solve the object concerning the period of time for process and the processing efficiency, a still further another method of the present invention for manufacturing the reclosable packaging bag comprises the steps of:

placing at least two sheets of film material one upon another to prepare a non-joined main bag body, upper and lower opposite edges and left-hand and right-hand side edges of which have not as yet been joined with each other;

folding upper portions of said at least two sheets of film material so as to be separate from each other to form a pair of bent portions;

placing said pair of bent portions in a linear-fastener molding machine;

continuously forming fist and second linear fastening members for a linear fastener on inner surfaces of said pair of bent portions of said non-joined main bag body by an insert injection molding, respectively, excluding opposite side edges thereof; and heat-sealing said lower edge and said left-hand and right-hand side edges of said non-joined main bag body over their entirety.

The method may further comprise the step of inserting a sleeve for keeping a prescribed shape of said main bag body thereinto, after completion of the final step.

The method may further comprise the step of placing a sleeve for keeping a prescribed shape of said main bag body in said non-joined main gab body.

DETAILED DESCRIPTION OF THE PREFERRED EMBODIMENTS

Embodiments of the present invention will be described below with reference to the drawings.

Figure 1:
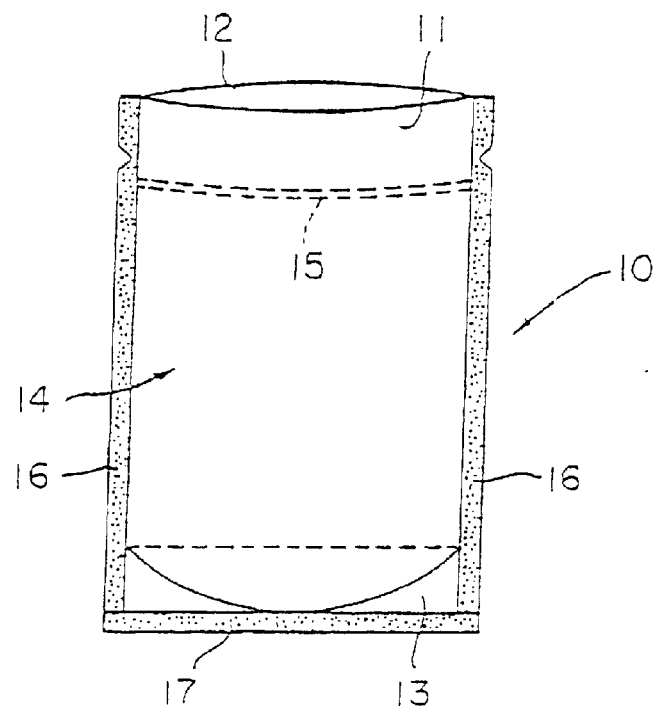
FIG. 1 is a plan view of an embodiment of the reclosable packaging bag of the present invention.

FIG. 1 illustrates an example in which a reclosable packaging bag of the present invention is applied to a self-standing type reclosable packaging bag. The self-standing type reclosable packaging bag 10 comprises a main bag body 14 and a linear fastener 15. The main bag body 14 is composed of two sheets of film material 11, 12 for forming the opposite faces of the bag and of a sheet of film material 13 for forming the bottom of the bag. The linear fastener 15 is provided on the inner surface of the opening portion of the main bag body 14.

The above-mentioned main bag body 14 is prepared by folding the sheet of film material 13 in two, placing the thus folded sheet of film material 13 between the respective lower portions of the sheets of film material 11, 12 so that the folding edge 13a of the folded sheet of film material 13 is directed upward, heat-sealing the opposite side portions of the sheets of film material 11, 12 to form side heat-sealed portions 16, 16 and heat-sealing the lower portions of the sheets of film material 11, 12 to form a heat-sealed lower portion 17.

The above-mentioned sheets of film material 11, 12, 13 are formed of the same plastic film material. As such a sheet of film material, there can be used for example a laminate film composed of a polyester film having a thickness of 12 $\mu$m, an aluminum foil having a thickness of 9 $\mu$m and a polyethylene film having a thickness of 50 $\mu$m, or a laminate film composed of a polyester film having a thickness of 12 $\mu$m and a polyethylene film having a thickness of 50 $\mu$m.

Figure 2:
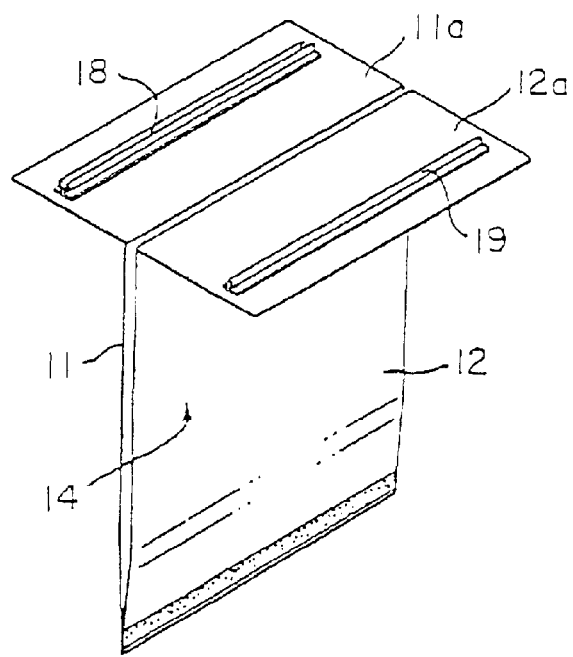
FIG. 2 is a view illustrating the linear fastener of the reclosable packaging bag as shown in FIG. 1.

The above-mentioned linear fastener 15 is composed of a female-fastening member 18 and a male-fastening member 19 as shown in FIG. 2. The linear fastener 15 is provided along the opening end of the main bag body 14 and has a length corresponding to a value, which is obtained by subtracting the total width of the side heat-sealed portions 16, 16 from the entire width of the main bag body 14, as shown in FIG. 1.

Contents received in the self-standing type reclosable packaging bag 10 may have a square or rectangular plate-shape. In such a case, the self-standing type reclosable packaging bag 10 can be deformed into a cube or a rectangular parallelepiped. It is preferable to provide easily bendable portions such as notches on portions to be bent of the female-fastening member 18 and the male-fastening member 19 of the linear fastener 15 in order to facilitate such deformation of the bag. It is also preferable to reduce the thickness of the both end portions of the female-fastening member 18 and the male-fastening member 19 to form thin portions.

FIG. 2 illustrates an example in which the female-fastening member 18 and the male-fastening member 19 that form the linear fastener 15 are joined to the main bag body 14 during the forming process of the main bag body 14. The female-fastening member 18 and the male-fastening member 19 are joined to the upper portions 11a, 12a of the sheets of film material 11, 12 for the main bag body 14, respectively. The opposite side edges of the upper portions 11a, 12a are not joined with each other.

Figure 3:
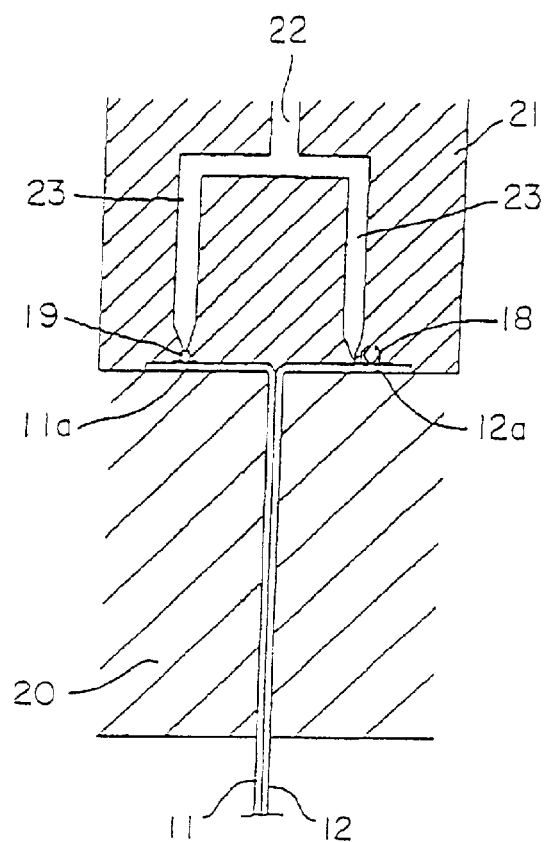
FIG. 3 is a view illustrating an example of the method for forming the linear fastener as shown in FIG. 2.

More specifically, the upper portions 11a, 12a of the sheets of film material 11, 12, having the opposite side edges, which have not as yet been joined with each other, are bent at right angles in opposite directions so as to be separate from each other. The upper portions 11a, 12a thus bent are placed between dies 20 and 21 of a linear-fastener molding machine as shown in FIG. 3. Then, synthetic resin such as polyethylene resin is injected in a molten state from a gate 22 of the die 21 to molding spaces through runners 23, 23 by an insert injection molding. Consequently, the female-fastening member 18 and the male-fastening member 19 are joined onto the inner surfaces of the bent upper portions 11a, 12a. Each of the female-fastening member 18 and the male-fastening member 19 has a smaller length than the entire width of the main bag body 14. More specifically, both of them have a length corresponding to a value, which is obtained by subtracting the total width of the side heat-sealed portions 16, 16 that are to be formed by a subsequent process, from the entire width of the main bag body 14.

Figure 4:
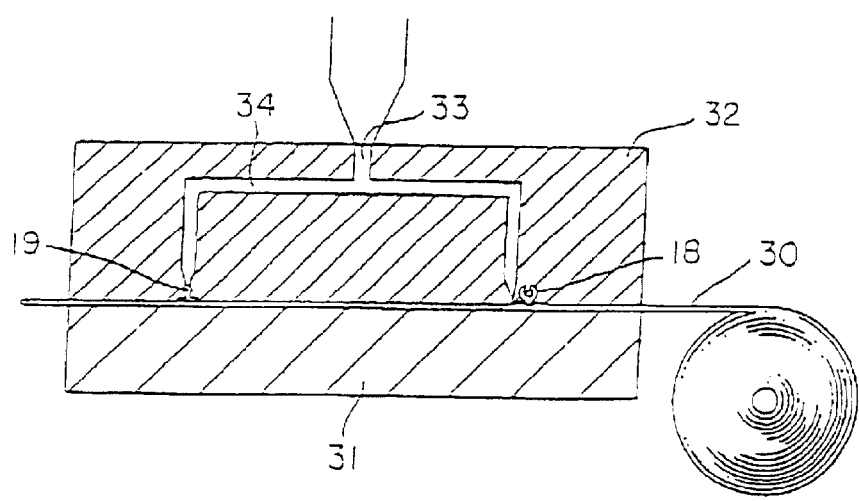
FIG. 4 is a view illustrating another example of the method for forming the linear fastener as shown in FIG. 2.
Figure 5:
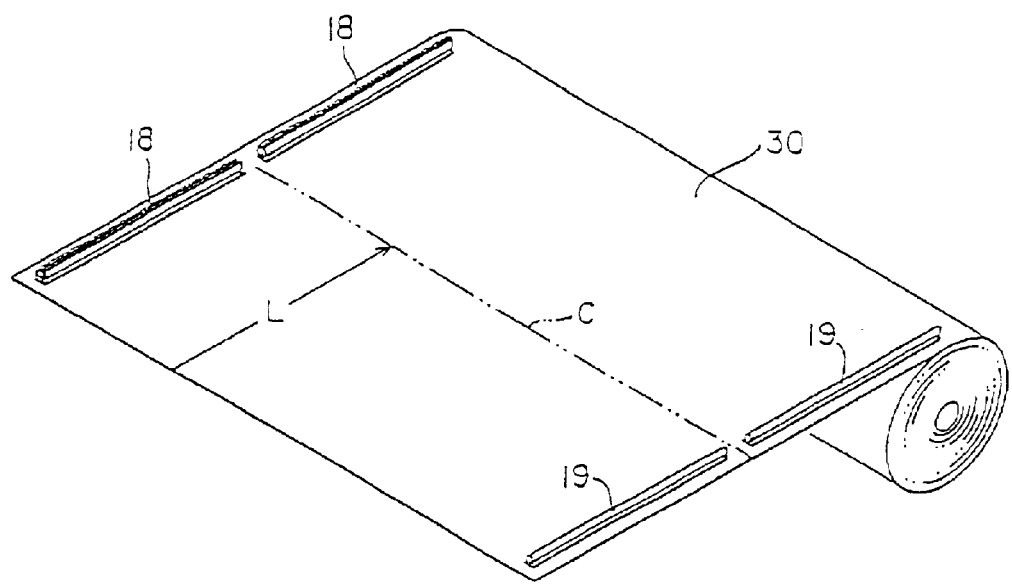
FIG. 5 is a view illustrating the linear fastener, which is formed in accordance with the linear fastener forming method as illustrated in FIG. 4.

FIG. 4 illustrates an example in which the female-fastening member 18 and the male-fastening member 19 that form the linear fastener 15 are joined to a sheet of film material 30 prior to the formation of the main bag body 14.

More specifically, the female-fastening member 18 and the male-fastening member 19 are joined on one surface of the sheet of film material 30 so as to be spaced apart from each other as shown in FIG. 4, by placing the sheet of film material 30 between dies 31 and 32 of a linear-fastener molding machine and injecting synthetic resin such as polyethylene resin in a molten state from a gate 33 of the die 32 to molding spaces through runners 34 by an insert injection molding. The length of each of the female-fastening member 18 and the male-fastening member 19 that form the linear fastener 15 is not identical with the entire width L of the main bag body 14 to be formed, but has a length corresponding to a value, which is obtained by subtracting the total width of the side heat-sealed portions 16, 16 that are to be formed by a subsequent process, from the entire width L of the main bag body 14.

Now, description will be given below of a method for manufacturing the self-sanding reclosable packaging bag 10.

First, there are prepared three sheets of film material, i.e., the sheets of film material 11, 12 for forming the opposite faces of the main bag body 14 and the sheet of film material 13 for forming the bottom of the main bag body 14.

Then, the sheet of film material 13 for forming the bottom of the main bag body 14 is folded in two. The folded sheet of film material 13 is placed between the respective lower portions of the sheets of film material 11, 12 so that the folding edge 13a of the folded sheet of film material 13 is directed upward. A heat-sealing process is applied to the lower portions of the sheets of film material 11, 12 and the sheet of film material 13 to form a heat-sealed lower portion 17.

Then, the upper portions 11a, 12a of the sheets of film material 11, 12 having the heat-sealed lower portion 17 formed at their lower edges are bent at right angles in opposite directions so as to be separate from each other. The upper portions 11a, 12a thus bent are placed between dies 20 and 21 of a linear-fastener molding machine as shown in FIG. 3.

Then, synthetic resin such as polyethylene resin or polypropylene resin is injected in a molten state from the gate 22 of the die 21 to the molding spaces through the runners 23, 23 by the insert injection molding, so as to extend on the bent upper portions 11a, 12a that are placed between the dies 20 and 21 of the linear-fastener molding machine. The synthetic resin injected into the molding spaces in the molten state is cooled in these spaces. As a result, the female-fastening member 18 and the male-fastening member 19 that form the linear fastener 15 are joined on the inner surfaces of the upper portions 11a, 12a of the main bag body 14, respectively. The length of each of the female-fastening member 18 and the male-fastening member 19 is previously determined to be smaller than the entire width of the main bag body 14 by the total width of the side heat-sealed portions 16, 16.

The bent upper portions 11a, 12a for the main bag body 14 are placed one upon another so that the male-fastening member 19 engages with the female-fastening member 18. A heat-sealing process is applied to the opposite side portions of the sheets of film material 11, 12 to form side heat-sealed portions 16, 16. The self-standing type reclosable packaging bag 10 is prepared in this manner.

Now, description will be given below of a method for manufacturing a three-side-sealed type reclosable packaging bag.

First, a rolled strip of film material 30 is prepared. A part of the rolled strip of film material 30, which is unrolled therefrom, is placed between dies 31, 32 of a linear-fastener molding machine as shown in FIG. 4.

Then, synthetic resin such as polyethylene resin is injected in a molten state from a gate 33 of the die 32 to molding spaces through runners 34, 34 by an insert injection molding. As a result, the female-fastening member 18 and the male-fastening member 19 are joined on the one surface of the part of the rolled strip of film material 30 so as to be separate from each other. The length of each of the female-fastening member 18 and the male-fastening member 19 is smaller than the entire width L of the main bag body 14 by the total width of the side heat-sealed portions 16, 16.

Figure 6:
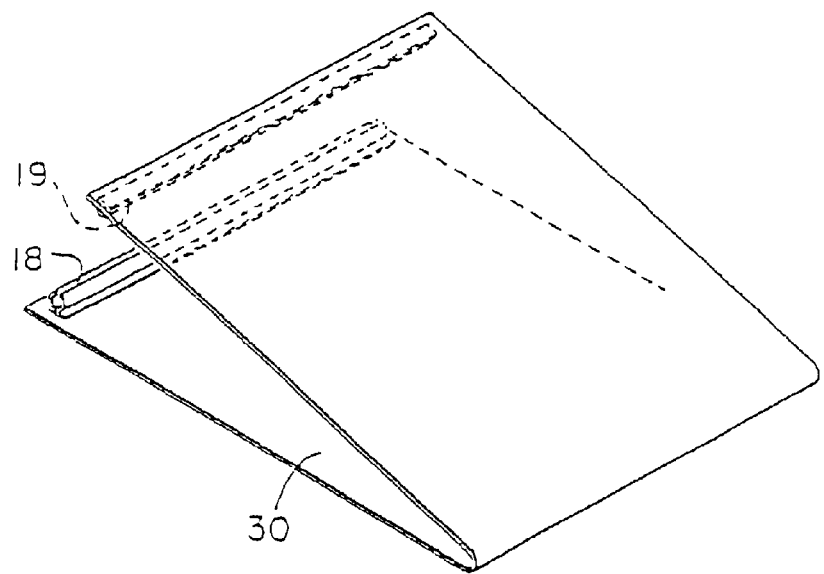
FIG. 6 is a plan view of another embodiment of the reclosable packaging bag of the present invention.

The rolled strip of film material 30, which has the female-fastening member 18 and the male-fastening member 19 joined thereon, is cut off along a line C to a length L corresponding to the entire width of the main bag body 14 to be formed. The cut sheet of film material 30 has the female-fastening member 18 and the male-fastening member 19 on the opposite edges, as shown in FIG. 6. The cut sheet of film material 30 is folded in two along the intermediate line so that the female-fastening member 18 and the male-fastening member 19 engage with each other.

A heat-sealing process is applied to the opposite side portions of the sheet of film material 30, which has been folded in two, to form side heat-sealed portions 16, 16. The three-side-sealed reclosable packaging bag is prepared in this manner.

Now, description will be given below of a method for manufacturing a four-side-sealed type reclosable packaging bag.

First, two sheets of film material 11, 12 for forming the opposite faces of the reclosable packaging bag. These sheets of film material 11, 12 are placed one upon another. A heat-sealing process is applied to the lower portions of the sheets of film material 11, 12 to form a lower heat-sealed portion 17.

The sheets of film material 11, 12 have the lower heat-sealed portion 17 formed on their lower edges and the upper portions 11a, 12a, which have not as yet been joined with each other. Then, the upper portions 11a, 12a of the sheets of film material 11, 12 are bent at right angles in opposite directions so as to be separate from each other. The upper portions 11a, 12a thus bent are placed between the dies 20 and 21 of the linear-fastener molding machine as shown in FIG. 3.

Then, synthetic resin such as polyethylene resin is injected in a molten state from the gate 22 of the die 21 to the molding spaces through the runners 23, 23 by an insert injection molding, so as to extend on the bent upper portions 11a, 12a that are placed between the dies 20 and 21 of the linear-fastener molding machine. As a result, the female-fastening member 18 and the male-fastening member 19 are joined on the inner surfaces of the bent upper portions 11a, 12a. The length of each of the female-fastening member 18 and the male-fastening member 19 is previously determined to be smaller than the entire width of the main bag body 14 by the total width of the side heat-sealed portions 16, 16.

The bent upper portions 11a, 12a for the main bag body 14 are placed one upon another so that the male-fastening member 19 engages with the female-fastening member 18. A heat-sealing process is applied to the opposite side portions of the sheets of film material 11, 12 to form side heat-sealed portions 16, 16. The self-standing type reclosable packaging bag is prepared in this manner.

Figure 10:
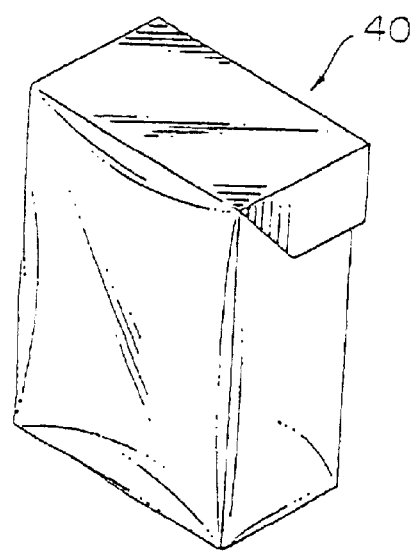
FIG. 10 is a view illustrating a packaged article, which is obtained by filling the reclosable packaging bag with the contents having the rectangular plate-shape.

FIG. 10 illustrates a packaged article, which is obtained by filling a reclosable packaging bag with contents having a rectangular plate-shape.

The packaged article 40 comprises a three-side-sealed reclosable packaging bag 41 and the contents (not shown) such as cookies, crackers or the like, having the rectangular plate-shape received in the bag 41.

Figure 7:
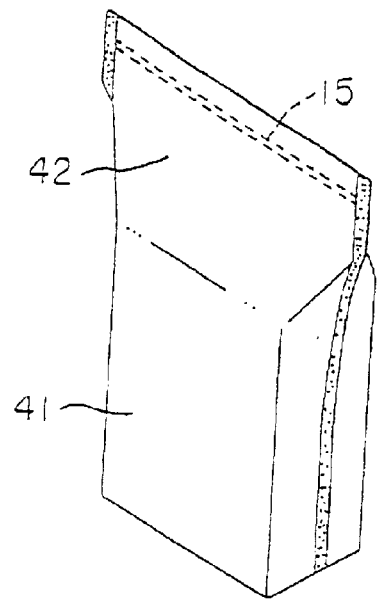
FIG. 7 is a view illustrating the first stage of the packaging process of the reclosable packaging bag of the present invention, in which the contents having a rectangular plate-shape are received.

Receipt of the contents having the rectangular plate-shape in the three-side-sealed reclosable packaging bag 41 deforms the bag 41 into a rectangular parallelepiped as shown in FIG. 7, which has a side corresponding to the shape of the contents. In this case, a portion of the bag, which includes the side heat-sealed portion, is deformed into a flat portion, while the opposite faces of the bag expand outward. As a result, the width of the upper portion 42 of the deformed bag, which includes the linear fastener 15 and to which the contents do not come, is larger than the width of the lower portion of the deformed bag so that the upper portion 42 projects from the above-mentioned flat portion in the width direction of the bag.

Figure 8:
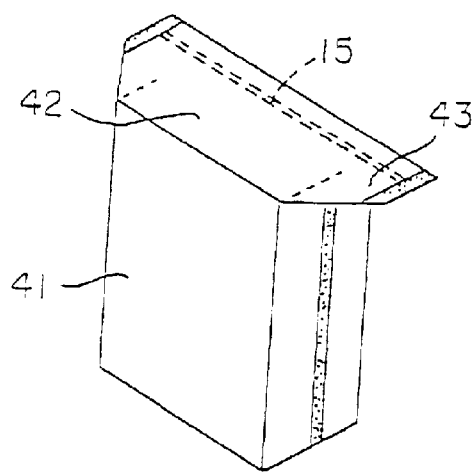
FIG. 8 is a view illustrating the second stage of the packaging process of the reclosable packaging bag of the present invention, in which the contents having a rectangular plate-shape are received.
Figure 9:
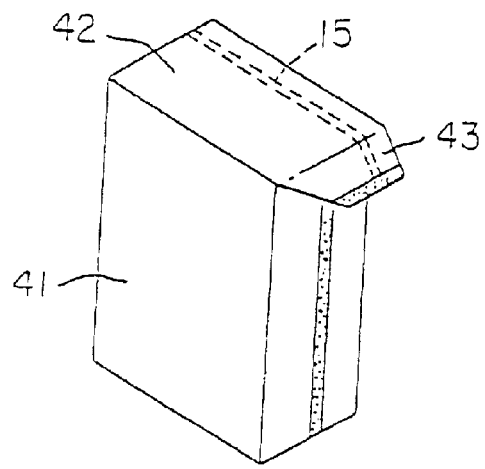
FIG. 9 is a view illustrating the third stage of the packaging process of the reclosable packaging bag of the present invention, in which the contents having a rectangular plate-shape are received.

The upper portion 42 of the three-side-sealed reclosable packaging bag 41 is folded along the upper horizontal plane of the contents as shown in FIG. 8, in order to form the packaged article 40 having the rectangular shape as shown in FIG. 10. The opposite side edges of the upper portion 42 thus folded project from the above-mentioned flat portion including the side heat-sealed portion. The projecting portion 43 is bent downward so as to be in parallel with the vertical side plane of the contents as shown in FIG. 9. In this case, it is preferable to provide an easily bendable portion such as a notch on a portion of the linear fastener 15, which corresponds to a bending line along which the projecting portion 43 is to be bent, thus permitting an easy bending process of the projecting portion 43.

Now, description will be given below of the reclosable packaging bag of the other embodiment of the present invention with reference to FIGS. 11 and 12.

The reclosable packaging bag 50 comprises a main bag body 54, a linear fastener 55 and a sleeve 60.

The main bag body 54 is formed by folding a single sheet of film material in two so that the folding line locates downward and heat-sealing the opposite sides of it. More specifically, the main bag body 54 has an opening at the upper portion and the heat-sealed portions 56, 56 on the opposite sides.

The linear fastener 55 is provided along the opening of the main bag body 54 in the same manner as in the embodiment as shown in FIG. 2. More specifically, a male-fastening member for the linear fastener is formed on the inner surface of one of the opposing portions 51, 52 of the sheet of film material for forming the main bag body 54, in the vicinity of the opening thereof, and a female-fastening member for the linear fastener is formed on the inner surface of the other of the opposing portions 51, 51 thereof. The male and female-fastening members for the linear fastener 55 are provided on the portions of the sheet of film material, excepting the heat-sealed portions 56, 56.

Figure 12A:
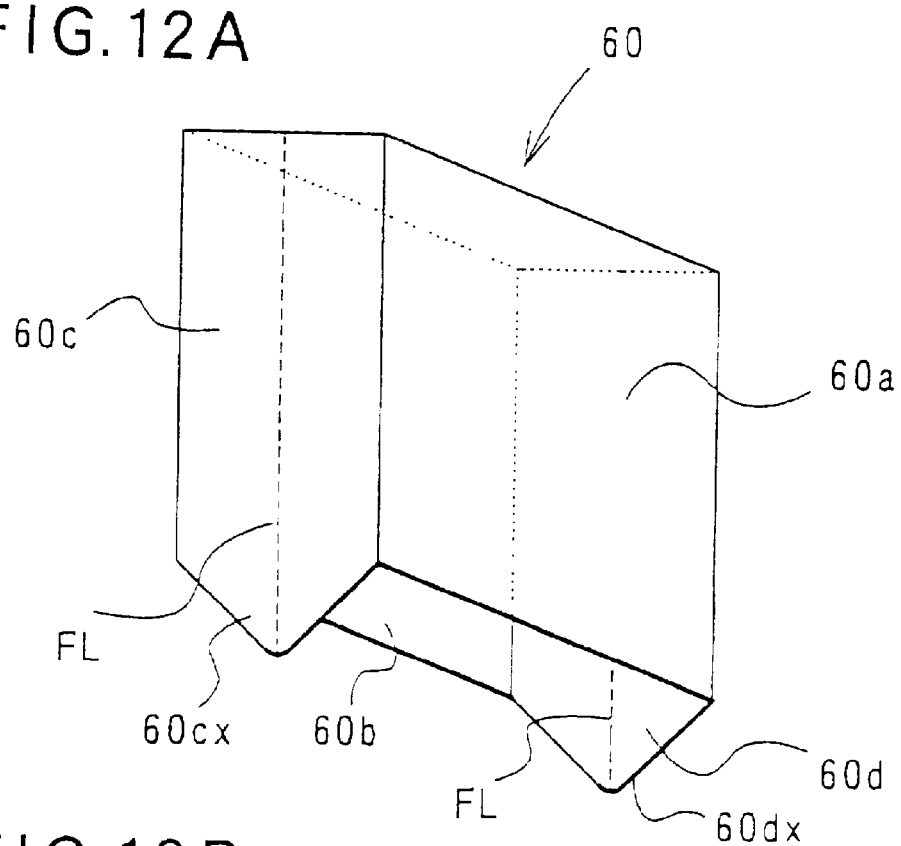
FIGS. 12A & 12B is a schematic view of a sleeve used in the reclosable packaging bag as shown in FIG. 11.

The sleeve 60 is formed of bendable material such as paper, synthetic resin or the like. The sleeve 60 is composed of a pair of opposing front and rear face portions 60a, 60b and a pair of side face portions 60c, 60d that are provided so as to connect the opposite edges of the front and rear face portions 60a, 60b with each other and have projections 60cx, 60dx having a triangular shape, respectively. The front and rear face portions 60a, 60b have the same rectangular shape. The side face portions 60c, 60d have the same pentagonal shape, i.e., the shape obtained by combining a rectangle with an isosceles triangle locating below it. Each of the side face portions 60c, 60d has a folding line FL, which is formed in the central portion in its width direction so as to extend the longitudinal direction, as shown in FIG. 12(a). Accordingly, the sleeve 60 may have the three-dimensional structure as shown in FIG. 12(a) and be folded in a flat state as shown in FIG. 12(b) by bending the side face portions 60c, 60d along the folding lines FL of the side face portions 60c, 60d, while moving the folding lines FL outward.

Figure 12B:
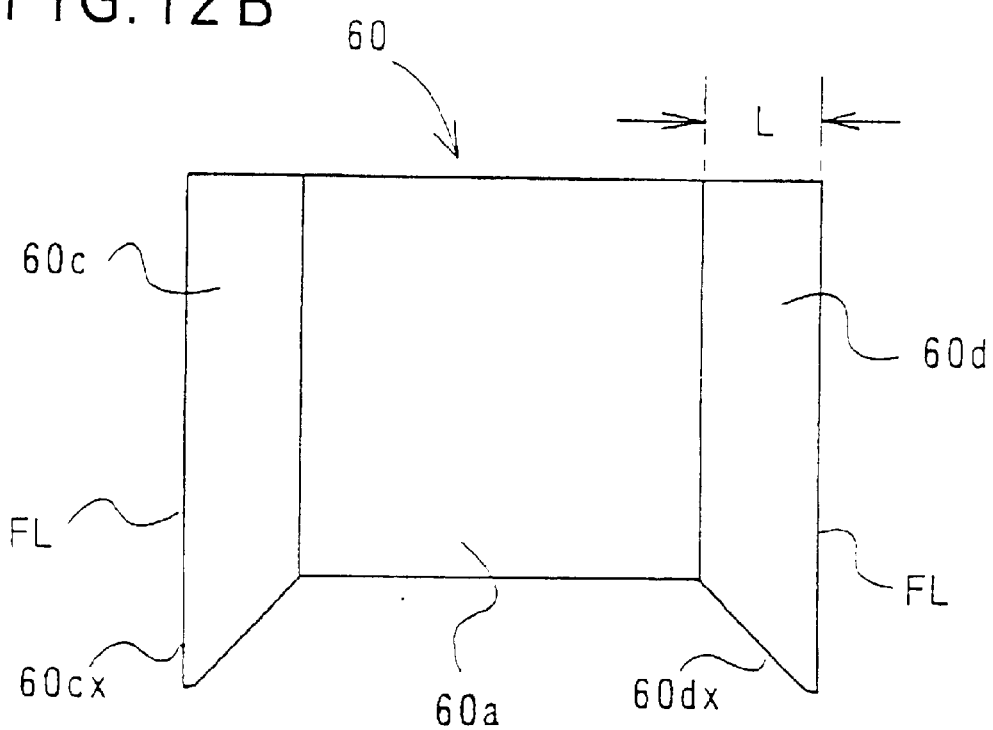

The sleeve 60, which is kept in the folded state as shown in FIG. 12(b), is inserted into the main bag body 54 so that the peaks of the projections 60cx, 60dx come into contact with the bottom of the main bag body 54.

Figure 11:
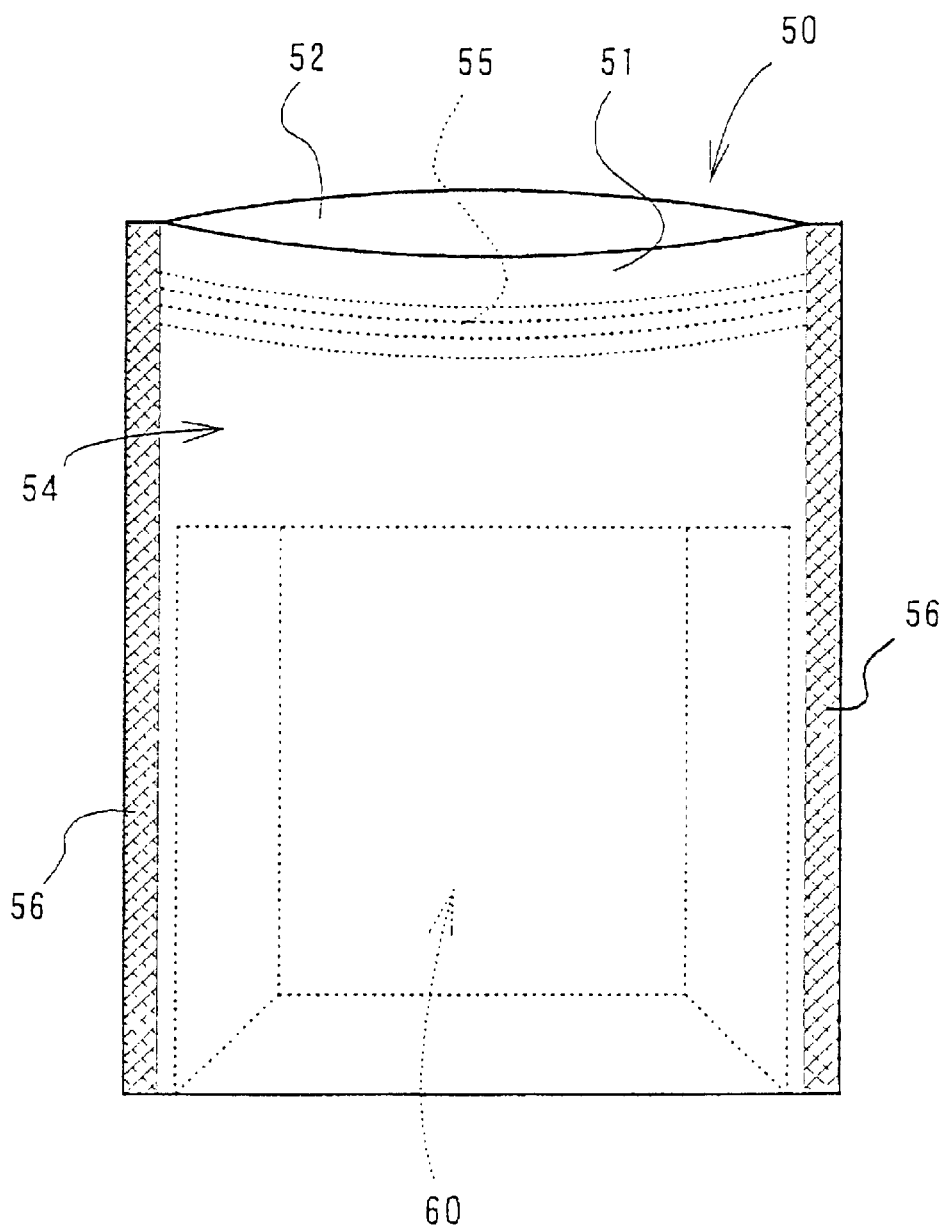
FIG. 11 is a plan view of another embodiment of the reclosable packaging bag of the present invention.
Figure 16A:
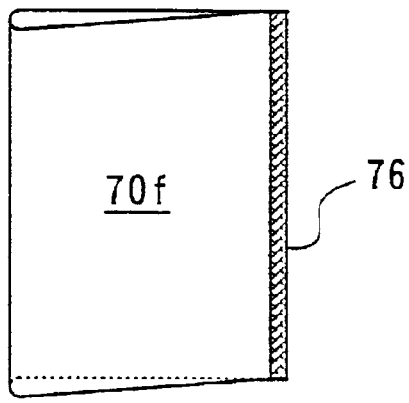
FIGS. 16A, 16B, 16C, 16D, 16E, & 16F is a schematic view illustrating steps for manufacturing the reclosable packaging bag of the present invention.
Figure 16B:
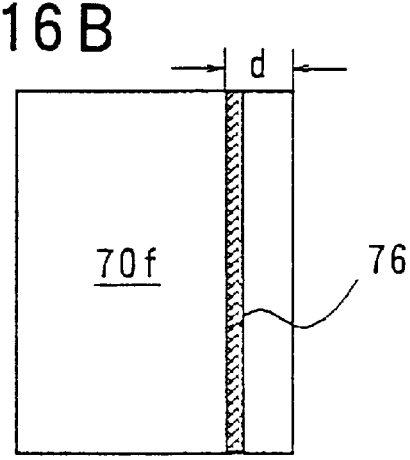
Figure 16C:
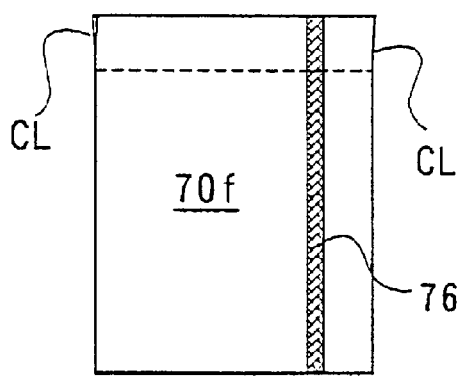
Figure 16D:
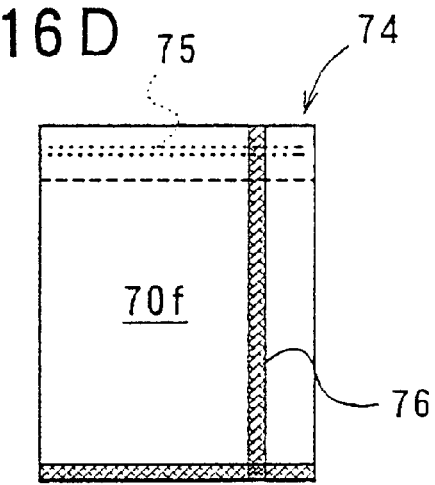
Figure 16E:
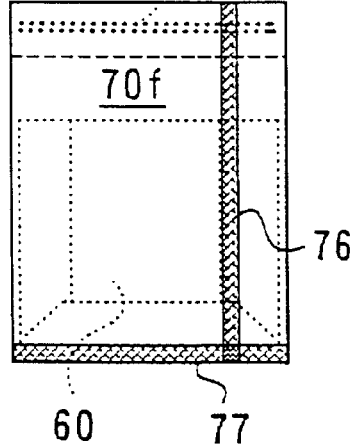
Figure 16F:
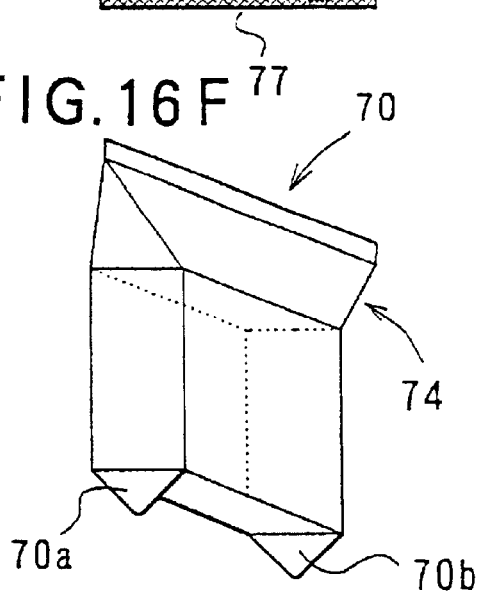

Changing the shape of the sleeve, which has been inserted into the main bag body 54, into the three-dimensional shape as shown in FIG. 12(a) causes the main bag body 54 to be kept in the shape as shown in FIG. 16(f) (although the main bag body 74 used in the embodiment as shown in FIG. 16(f) differs from the main bag body 54 as shown in FIG. 11 in the former has a single heat sealed-portion). In such a state, the self-standing shape can be provided by bending inward the projections 60cx, 60dx of the sleeve 60 together with the main bag body 54. The reclosable packaging bag 50 can be changed into a stackable rectangular parallelepiped by bending the upper portions of the main bag body 54 as shown in FIGS. 8, 9 and 10.

Figure 13:
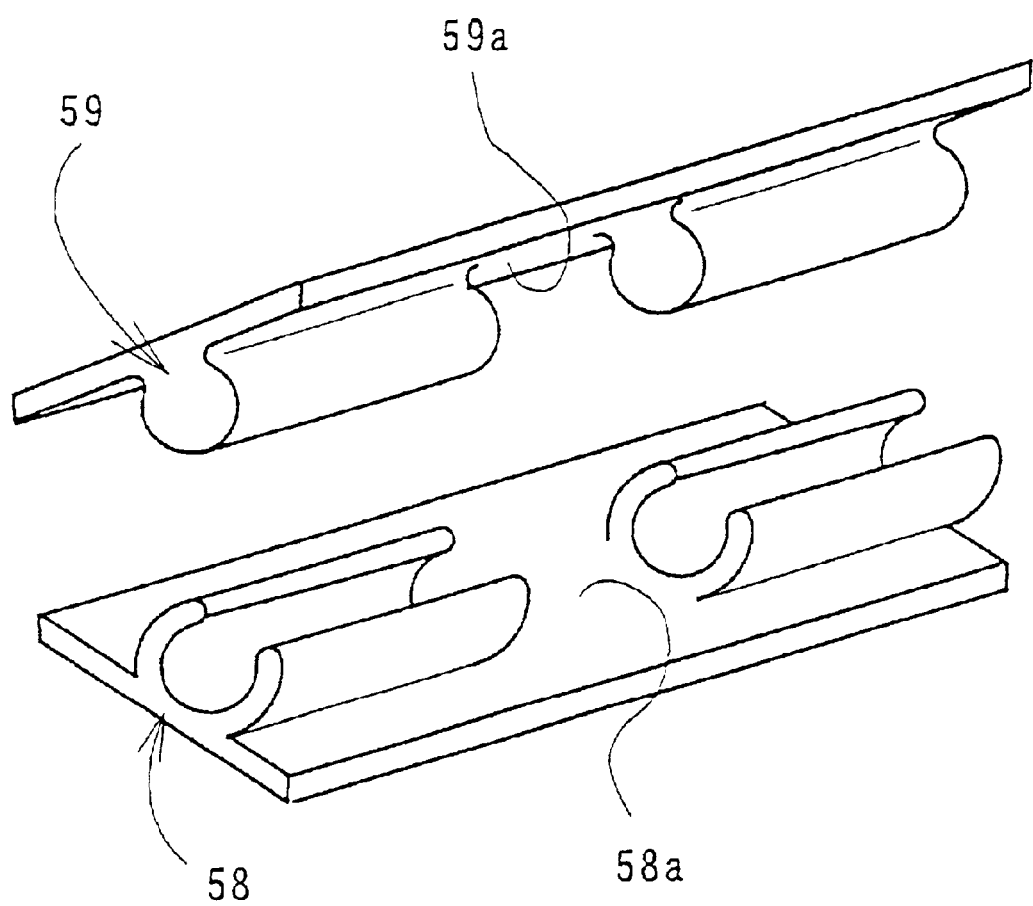
FIG. 13 is a partial perspective view illustrating an easily bendable portion of the linear fastener of the reclosable packaging bag as shown in FIG. 11.

The linear fastener 55 is also bent so as to coincide with the rectangular parallelepiped shape when bending the upper portions of the main bag body 54. The linear fastener 55 has easily bendable portions 58a, 59a as shown in FIG. 13 so as to facilitate the above-mentioned bending operation.

The linear fastener 55 has the female-fastening member 58 and the male-fastening member 59 in the same manner as the embodiment as shown in FIG. 2. The easily bendable portions 58a, 59a comprise flat portions, which are formed by removing partially the female-fastening member 58 and the male-fastening member 59 in the bending portions, i.e., the portions corresponding to the upper edges of the side face portions 60c, 60d of the sleeve 60. Accordingly, the easily bendable portions 58a, 59a has neither female-receiving portion nor male-engaging portion, which are provided in the other region, and has only the flat plate portion. It is therefore possible to bend easily the linear fastener 55 without causing unseemly outward projection of the bent portions, thus providing a nice-looking stackable rectangular parallelepiped shape of the reclosable packaging bag.

The easily bendable portions are not limited only to the above-described structure. The easily bendable portions may be formed as holes that are obtained by a punching operation or the like in the corresponding bending portions of the female-fastening member 58 and the male-fastening member 59, thus facilitating the bending step.

The formation of the easily bendable portions 58a, 59a only in the bending portions of the linear fastener 55 will suffice. The easily bendable portions 58a, 59a do not remarkably deteriorate the sealing property by the linear fastener 55. However, when there is a demand for an excellent sealing property of the reclosable packaging bag, it is preferable to provide the easily bendable portions 58a, 59a with auxiliary sealing means 58b, 58b, 59b, 59b as shown in FIG. 14.

The auxiliary sealing means comprise a pair of ribs 58b, 58b having a triangular cross-section, which are formed integrally with the flat portion 58a for the female-fastening member 58 so as to project toward the male-fastening member 58 and a pair of ribs 59b, 59b having a triangular cross-section, which are formed integrally with the flat portion 59a for the male-fastening member 59 so as to project toward the female-fastening member 58. The tip end portions of the ribs 58b, 58b for the female-fastening member 58 come into contact with the tip end portions of the ribs 59b, 59b for the male-fastening member 59, respectively, so as to improve the sealing property between the flat portions 58a, 59a, in the sealing state of the linear fastener 55, i.e., in a state in which the male-fastening member 59 engages with the female-fastening member 58.

The projection height of the ribs 58b, 58b and 59b, 59b are substantially identical with half of the depth of the female-receiving portion of the female-fastening member 58 and half the height of the male-engaging portion of the male-fastening member 59, respectively. As a result, these ribs 58b, 58b and 59b, 59b do not deteriorate the easily bending property of the easily bendable portions 58a, 59a.

Figure 14:
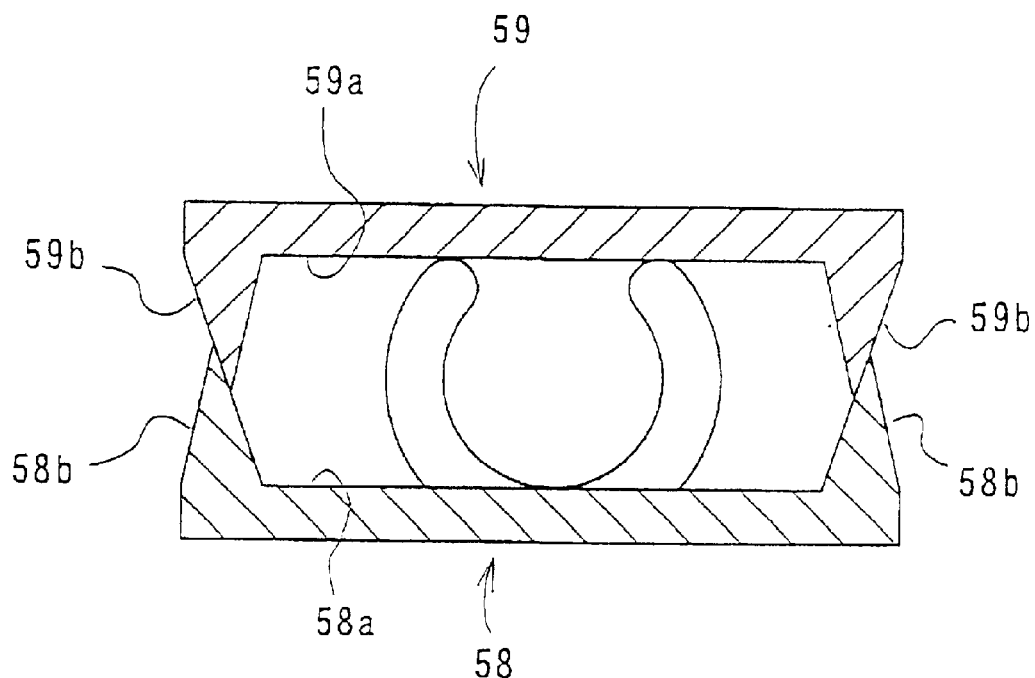
FIG. 14 is a cross-sectional view illustrating an auxiliary sealing means provided on the easily bendable portion as shown in FIG. 13.

The ribs 58b, 58b and 59b, 59b as shown in FIG. 14 locate so as to be apart outside from the opposite sides of the female-receiving portion of the female fastening member 58 and the opposite sides of the male-engaging portion of the male-fastening member 59 by a prescribe distance. Provision of the ribs 58b, 58b and 59b, 59b in the vicinity of the female-receiving portion and the male engaging portion mentioned above permits to ensure a further excellent sealing property.

Figure 15:
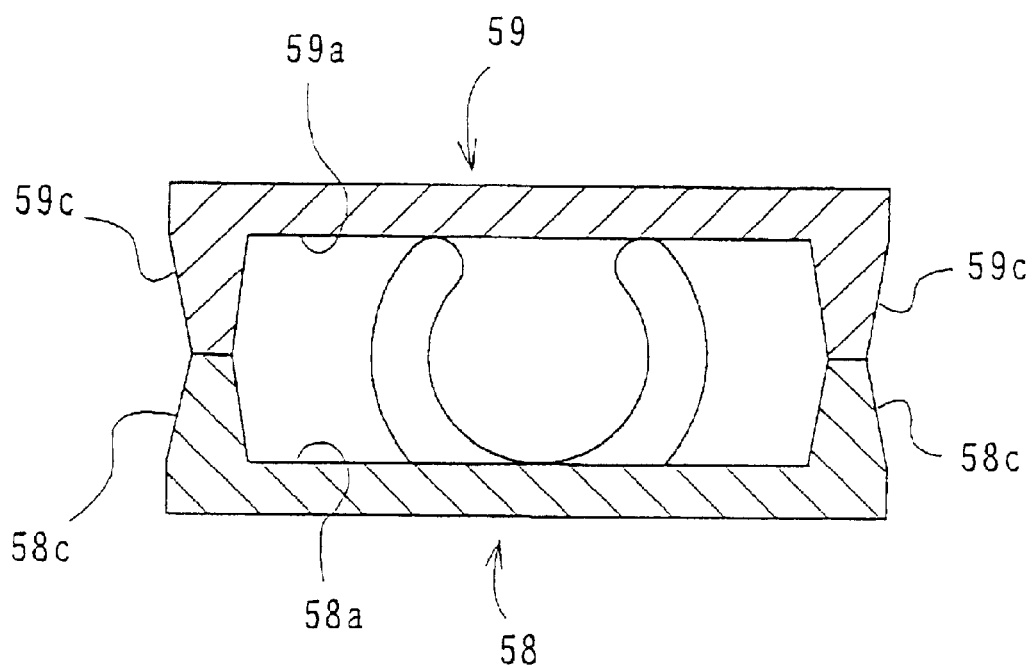
FIG. 15 is a cross-sectional view illustrating a modification of the auxiliary sealing means as shown in FIG. 14.

The above-mentioned auxiliary sealing means are not limited only to the above-mentioned structure. As shown in FIG. 15, they may comprise a pair of ribs 59c, 59c having a trapezoidal cross-section, which are formed integrally with the flat portion 58a for the female-fastening member 58 so as to project toward the male-fastening member 58 and a pair of ribs 59c, 59c having a trapezoidal cross-section, which are formed integrally with the flat portion 59a for the male-fastening member 59 so as to project toward the female-fastening member 58. In this case, the upper surface portions of the ribs 58c, 58c for the female-fastening member 58 come into contact with the tip lower surface portions of the ribs 59c, 59c for the male-fastening member 59, respectively, so as to improve the sealing property between the flat portions 58a, 59a, in the sealing state of the linear fastener 55, i.e., in a state in which the male-fastening member 59 engages with the female-fastening member 58.

Now, description will be given below of a method for manufacturing the reclosable packaging bag of the other embodiment described above of the present invention.

The manufacturing method of the present invention comprises a preparation step for a non-joined main bag body for a packaging bag, an position adjustment and folding step, a cutting and bending step, a linear fastener forming step, a heat-sealing step and a sleeve-insertion step.

The preparation step for the non-joined main bag body is carried out by placing the opposite ends of a single sheet of film material 70f one upon another and heat-sealing the overlapping portions of the sheet over their entirety in the longitudinal direction to form a heat-sealed portion 76, thus preparing the non-joined main bag body having the upper and lower openings (see FIG. 16(a)).

The position adjustment and folding step is carried out by turning the non-joined main bag body in its circumferential direction so that the inside edge of the above-mentioned heat-sealed portion 76 is apart from the one side edge by a prescribed distance "d" and folding it in a flat state (see FIG. 16(b)). The distance "d" is substantially identical with the half of the width of the side face portion 60d of the sleeve 60, which is used in the sleeve-insertion step, i.e., the length "L" as shown in FIG. 12(b).

The cutting and bending step is carried out by forming cut-outs CL at the upper ends of the opposite side edges of the non-joined main bag body after the completion of the position adjustment and folding step, and then folding the upper portions of the non-joined main bag body, which correspond to the length of the cut-outs CL, so as to be separate from each other to form a pair of bent portions (see FIG. 16(c)).

The linear fastener forming step is carried out by placing the pair of bent portions in a linear-fastener molding machine and continuously forming the linear fastening members for the linear fastener on the inner surfaces of the pair of bent portions of by an insert injection molding, respectively, excluding opposite side edges thereof. The linear fastener forming step is identical with the linear fastener forming step in the embodiment as shown in FIG. 2. The description of it is therefore omitted.

The heat-sealing step is carried out by heat-sealing the lower edge of the non-joined main bag body over its entirety in the width direction of the bag to form a heat-sealed portion 77 and heat-sealing only the upper ends of the opposite side edges of the non-joined main bag body, which correspond to the cut-outs CL (see FIG. 16(d)). The main bag body 74 is prepared in this manner.

The sleeve-insertion step is carried out by inserting the sleeve 60 into the main bag body 74 (see FIG. 16(e)). The sleeve 60 is the same as that described in the embodiment as shown in FIGS. 11 and 12. The description of it is therefore omitted.

Changing the shape of the sleeve 60, which has been inserted into the main bag body 74, into the three-dimensional shape as shown in FIG. 12(a) causes the main bag body 74 to be kept in the shape as shown in FIG. 16(f). In such a state, the self-standing shape can be provided by bending inward the projections 60cx, 60dx of the sleeve 60 together with flap portions 70a, 70b of the main bag body 74. The reclosable packaging bag 70 can be changed into a stackable rectangular parallelepiped by bending the upper portions of the main bag body 74 as shown in FIGS. 8, 9 and 10.

In the reclosable packaging bag 70 formed in the manner as mentioned above, the non-joined main bag body is turned in its circumferential direction so that the inside edge of the heat-sealed portion 76 is apart from the one side edge by the prescribed distance "d", i.e., the length "L" as shown in FIG. 12(b). Accordingly, it is possible to place the heat-sealed portion 76 in the vicinity of the edge of the side face of the reclosable packaging bag 70 having the rectangular parallelepiped. The heat-sealed portion 76 therefore become inconspicuous, to keep a nice-looking external appearance of the reclosable packaging bag 70.

When the demand for improvement in the external appearance is not so severe, there may be omitted the step for turning the non-joined main bag body in its circumferential direction in the above-mentioned manufacturing method. When such a turning step is omitted, the heat-sealed portion is placed in the central portion of the side face of the reclosable packaging bag 70 having the rectangular parallelepiped.

Now, description will be given below of another method for manufacturing the reclosable packaging bag of the other embodiment described above of the present invention.

The other manufacturing method of the present invention comprises a sheet-folding step, a sleeve-placing step, a cutting and bending step, a linear fastener forming step and a heat-sealing step.

The sheet-folding step is carried out by folding a single sheet of film material 80f in two to prepare a non-joined main bag body the upper and lower edges and one side edge of which have not as yet been joined.

Figure 17A:
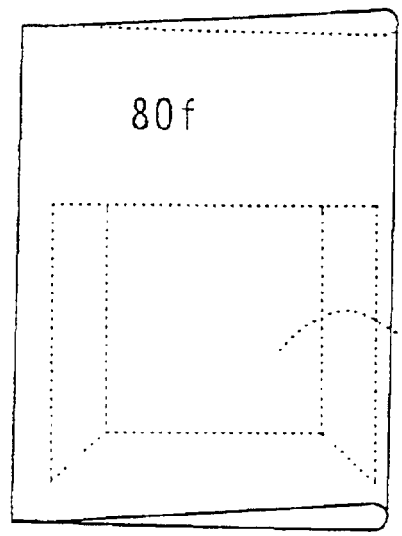
FIGS. 17A, 17B & 17C is a schematic view illustrating the other steps for manufacturing the reclosable packaging bag of the present invention.

The sleeve-placing step is carried out by placing the sleeve 60 in the non-joined main bag body (see FIG. 17(a)). The sleeve 60 may be temporarily secured to the non-joined main bag body by an adhesion means such as a hot-melting method. The sleeve 60 is the same as that described in the embodiment as shown in FIGS. 11 and 12. The description of it is therefore omitted.

The cutting and bending step is carried out by forming a cut-out at the upper end of one side edge of the non-joined main bag body, and then folding the upper portions of the non-joined main bag body, which correspond to the length of the cut-out, so as to be separate from each other to form a pair of bent portions.

The linear fastener forming step is carried out by placing the pair of bent portions in a linear-fastener molding machine and continuously forming the linear fastening members for the linear fastener on the inner surfaces of the pair of bent portions of by an insert injection molding, respectively, excluding opposite side edges thereof. The linear fastener forming step is identical with the linear fastener forming step in the embodiment as shown in FIG. 2. The description of it is therefore omitted.

Figure 17B:
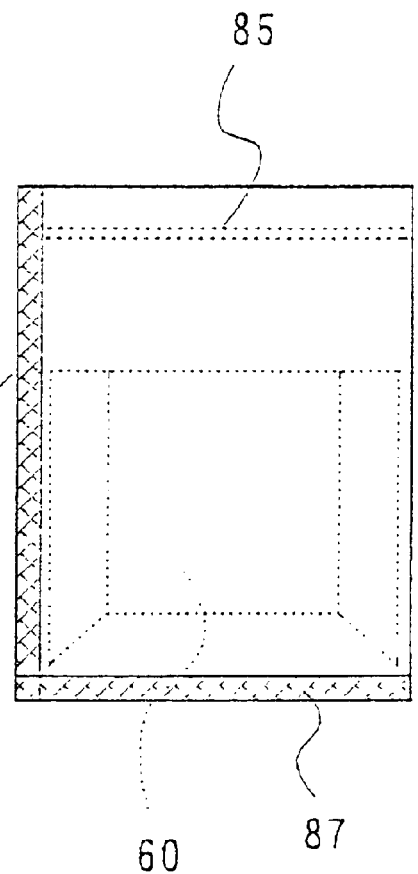

The heat-sealing step is carried out by heat-sealing the lower edge of the non-joined main bag body over its entirety in the width direction of the bag to form a lower edge heat-sealed portion 87, heat-sealing the other side edge over its entirety in the longitudinal direction to a side heat-sealed portion 86 and in addition, heat-sealing only the upper end of the one side edge of the non-joined main bag body, which correspond to the cut-out (see FIG. 17(b)). The main bag body 84 is prepared in this manner.

Figure 17C:
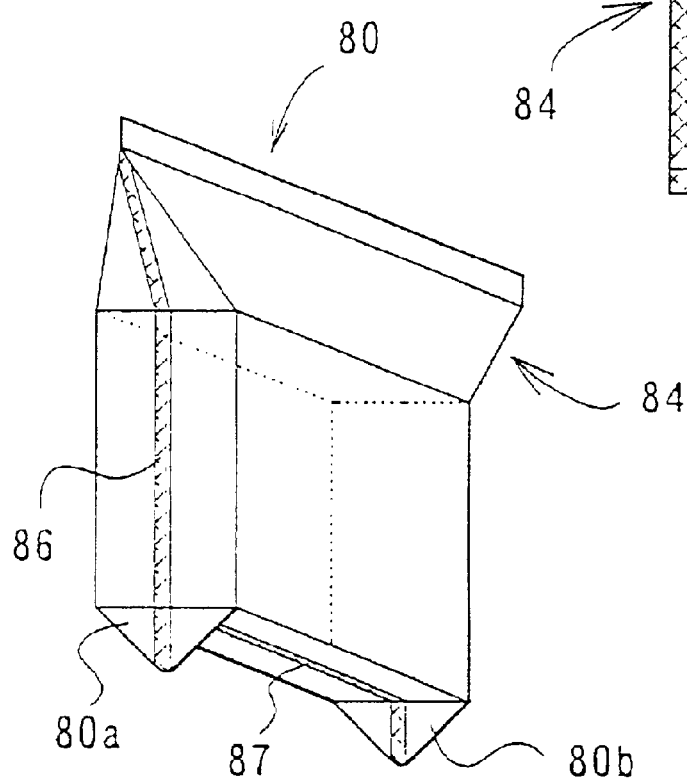

Changing the shape of the sleeve 60, which has been inserted into the main bag body 84, into the three-dimensional shape as shown in FIG. 12(a) causes the main bag body 84 to be kept in the shape as shown in FIG. 17(c). In such a state, the self-standing shape can be provided by bending inward the projections 60cx, 60dx of the sleeve 60 together with the main bag body 84. The reclosable packaging bag 80 can be changed into a stackable rectangular parallelepiped by bending the upper portions of the main bag body 84 as shown in FIGS. 8, 9 and 10.

When a co-extrusion film or the like, which has on its opposite surfaces a heat-sealing property, is used as the sheet of film material in the above-described method for manufacturing the reclosable packaging bag, it is possible to prevent the heat-sealed portion from projecting outward by applying an easy heating treatment to the reclosable packaging bag having the three-dimensional shape. It is therefore possible to impart a nice-looking appearance to the reclosable packaging bag having the three-dimensional shape. In addition, it is also possible to prevent a display condition of the packaging bags on a display shelf in a retail store from being disordered and the packaging bags from falling down from the display shelf due to entanglement of the heat-sealed portion of the packaging bag with that of the other packaging bag.

In the above-mentioned embodiment of the present invention, the sleeve has a shape as shown in FIG. 12. The sleeve is not limited only to the above-mentioned shape and may have any other shape by which the packaging main bag body can be kept in a prescribed shape.

The present invention also includes a reclosable packaging bag, which permits to solve the problem of improvement in stacking property. The reclosable packaging bag, which has fundamental elements of a main bag body having an opening and at least one heat-sealed portion and of a linear fastener provided on the opening portion of the main bag body, is further provided with a sleeve that is placed in the main bag body. The reclosable packaging bag is characterized in that the main bag body is folded into a prescribed three-dimensional shape defined by the sleeve so as to keep the prescribed three-dimensional shape.

As a result, in the above-mentioned reclosable packaging bag of the present invention, it is not always necessary to form the linear fastener by an insert injection unlike the above-mentioned embodiments of the present invention. More specifically, the linear fastener that has previously been formed may be fitted onto a prescribed place of the main bag body by adhesive agent, a thermal bonding process that is to be simultaneously applied during the heat-sealing process, or any other appropriate fitting means. In this case, it is preferable to form thin portions at the opposite ends of the linear fastener and/or easily bendable portions on portions thereof to be bent in the same manner as the above-described embodiments of the present invention. The reclosable packaging bag does not always require these features, when the demand for improvement in the external appearance is not so severe.

In the above-described embodiments of the present invention, each of the projections 60cx, 60dx of the sleeve 60 has a function of coming into contact with the bottom of the main bag body 54, 74, 84 to maintain a prescribed position of the sleeve 60 in the main bag body 54, 74, 84. If the main bag body has such a function, the projections 60cx, 60dx of the sleeve are not required. With respect to such a kind of reclosable packaging bag, the other embodiment of the present invention will be described below with reference to FIGS. 18 and 19.

The reclosable packaging bag 90 comprises a main bag body 94, a linear fastener 95 and a sleeve 60M1.

Figure 18:
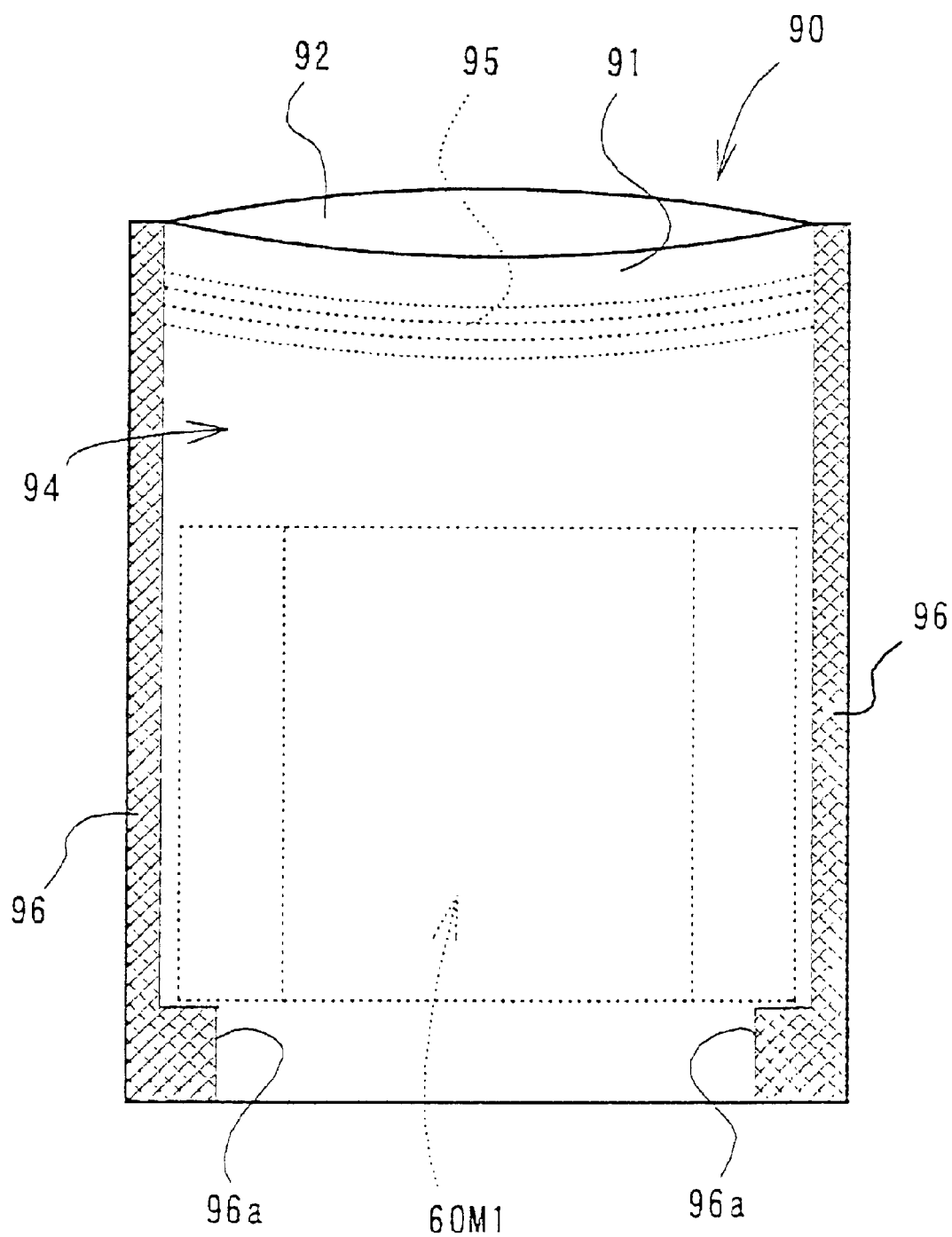
FIG. 18 is a plan view of further another embodiment of the reclosable packaging bag of the present invention.
Figure 19A:
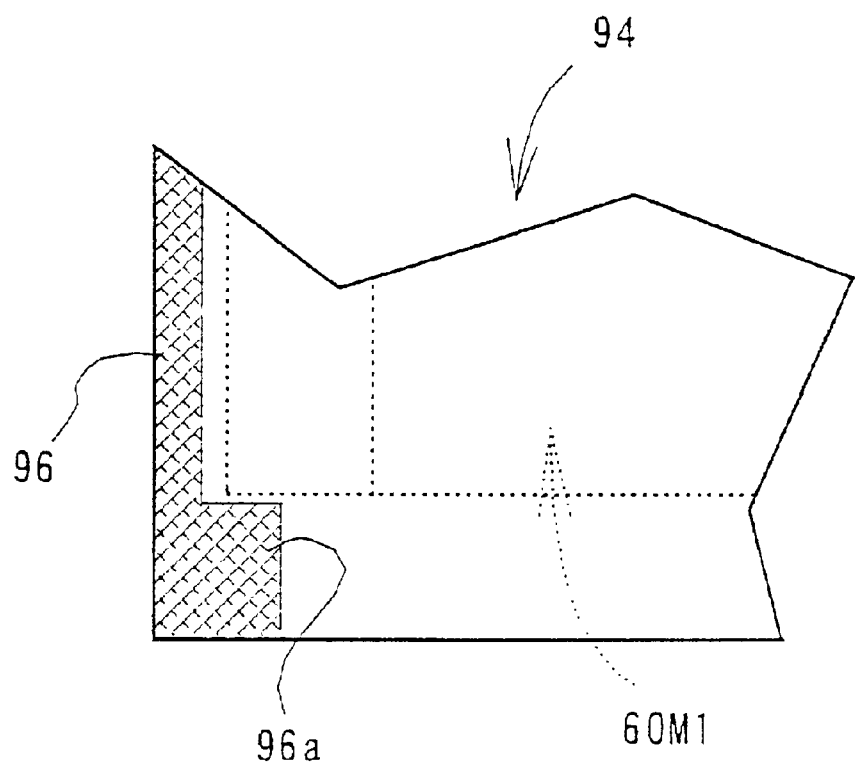
FIGS. 19A & 19B is a partial enlarged view illustrating the stopper portion of the reclosable packaging bag as shown in FIG. 18.

Opposing portions 91, 92 and heat-sealed portions 96, 96 of the main bag body 94 of the reclosable packaging bag 90 as shown in FIG. 18 correspond to the opposing portions 51, 52 and the heat-sealed portions 56, 56 of the main bag body 54 of the reclosable packaging bag 50 as shown in FIG. 11, respectively. Each of the heat-sealed portions 96, 96 is provided on its lower portion with a stopper portion 96a. The stopper portions 96a, 96a face each other as shown in FIG. 18 so that the opposite lower side edges of the sleeve 60M1 are placed on the stopper portions 96a, 96a. Each of the stopper portions 96a, 96a is formed by increasing the width of the lower portion of the heat-sealed portion 96 as shown in FIG. 19(a). The stopper portions 96a, 96a have a function of maintaining the prescribed position of the sleeve 60 in the main bag body 94 so that the lower portion of the main bag body 94 can easily be folded into a shape as shown in FIG. 8. The sleeve 60M1 therefore has no projections unlike the sleeve 60 described above.

Figure 19B:
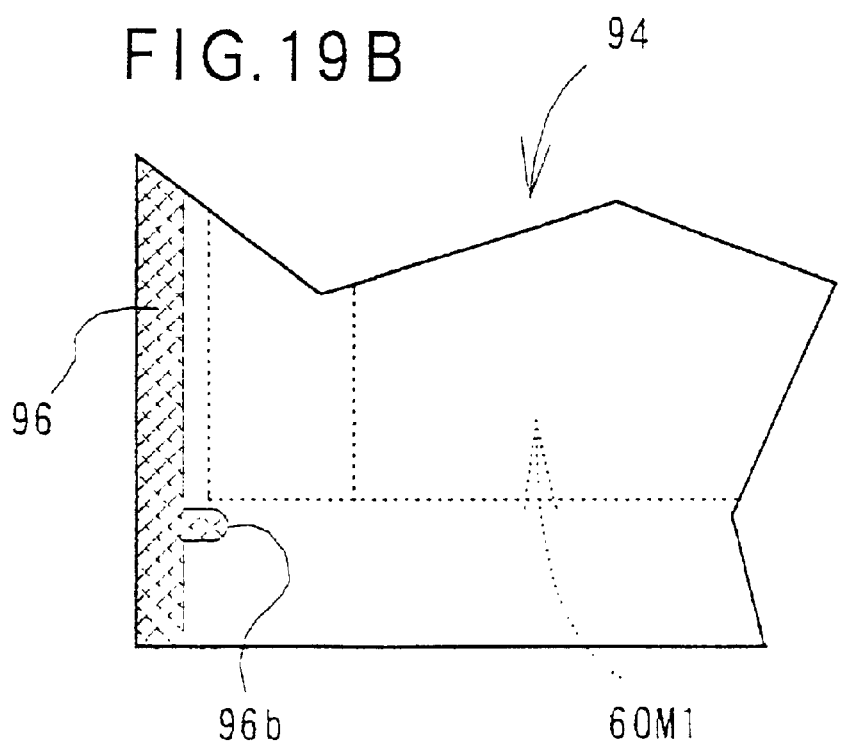

The stopper portion 96a is preferably formed on each of the heat-sealed portions 96, 96 as shown in FIG. 18. However, the single stopper portion may be formed on any one of the heat-sealed portions 96, 96. The stopper portion 96 may be formed by increasing partially the width of the lower portion of the heat-sealed portion 96 as shown in FIG. 19(b) so as to form a small projection 96b. The reclosable packaging bag 90 is folded into the shape as shown in FIG. 8 in the same manner as described above.

Figure 20A:
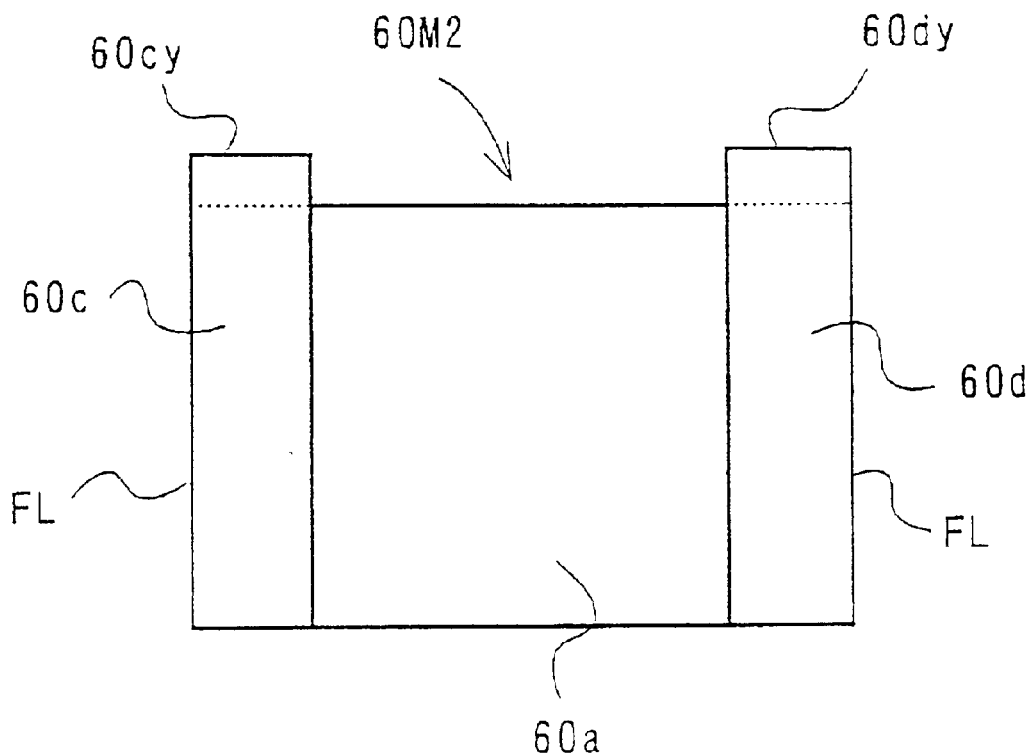
FIGS. 20A & 20B is a view illustrating a modification of the sleeve as shown in FIG. 18.
Figure 20B:
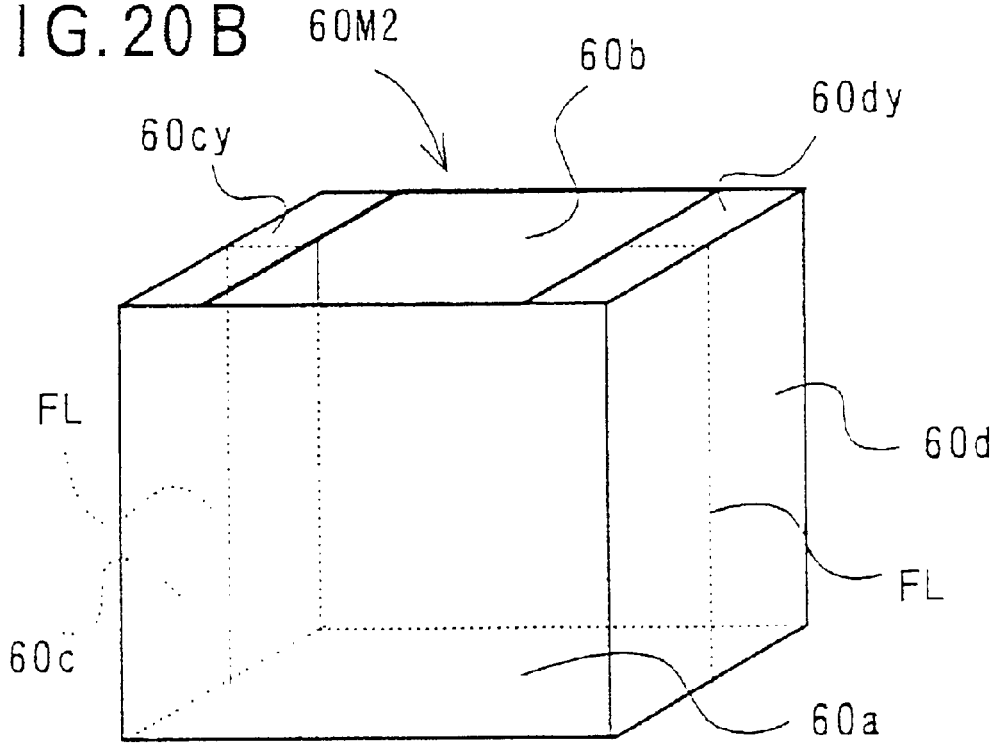

FIG. 20 illustrates a modification 60M2 of the sleeve 60M1 as shown in FIG. 18. The modified sleeve 60M2 has a pair of bendable reinforcement flaps 60cy, 60dy. More specifically, the sleeve 60M2 is composed of a pair of opposing front and rear face portions 60a, 60b and a pair of side face portions 60c, 60d. The reinforcement flaps 60cy, 60dy are integrally formed with the upper edges of the side face portions 60c, 60d of the sleeve so as to project upward. FIG. 20(a) illustrates the sleeve 60M2, which is folded into a flat state. The shape of the sleeve 60M2 folded in such a flat state is changed into a rectangular shape by unfolding the side face portions 60c, 60d. The reinforcement flaps 60cy, 60dy can be bent inward as shown in FIG. 20(b) so as to increase the strength of the unfolded sleeve 60M2. It is preferable to provide the side face portions 60c, 60d with the reinforcement flaps 60cy, 60dy, respectively. A single reinforcement flap may however be provided on one of the side face portions 60c, 60d.

Figure 21A:
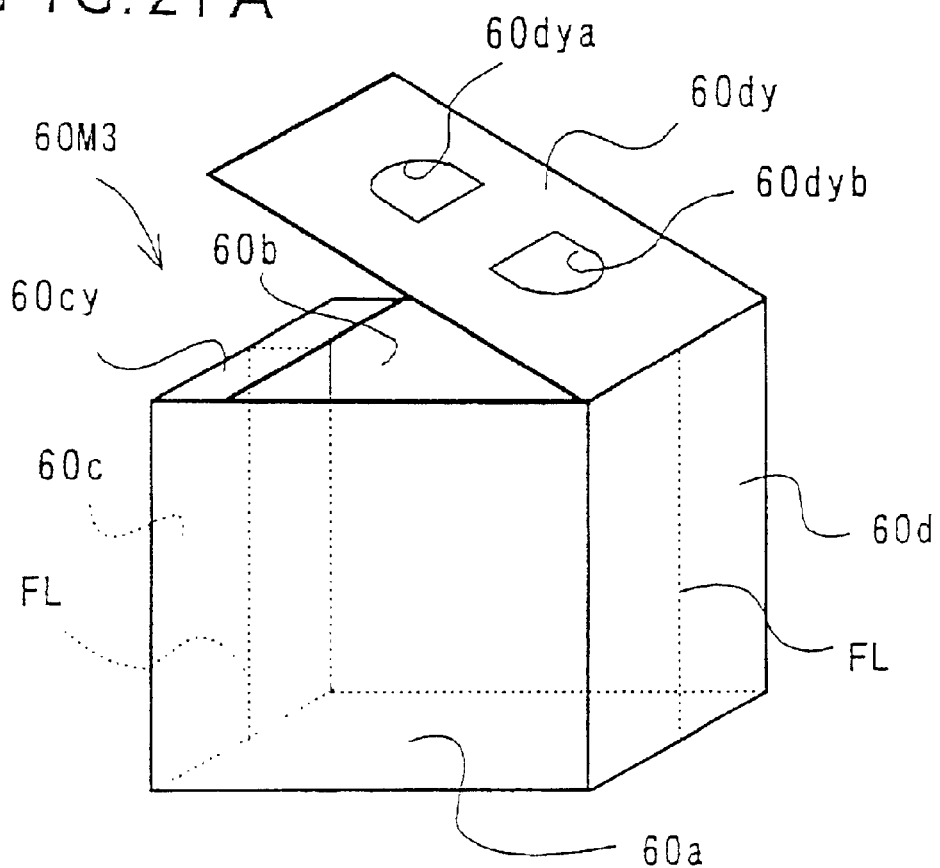
FIGS. 21A & 21B is a view illustrating a modification of the sleeve as shown in FIG. 20.
Figure 21B:
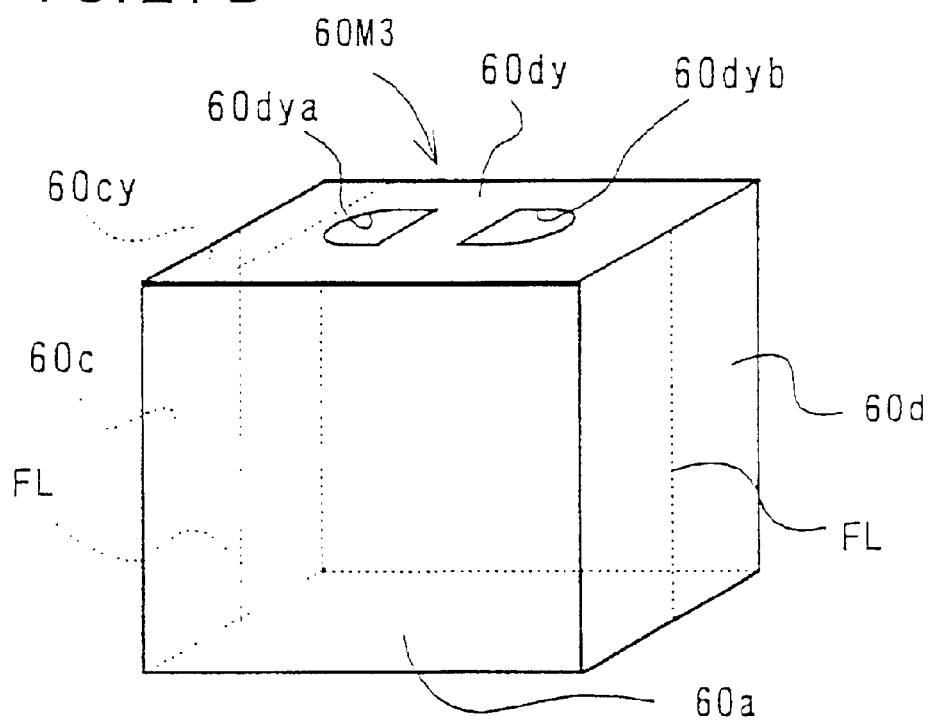

FIG. 21 illustrates the other modification 60M3 of the sleeve 60M2 as shown in FIG. 20. The sleeve 60M3 is identical to the sleeve 60M2 except that the former has a detachable cover portion 60dy. The same reference numerals are given to the same structural elements and the description of these elements is omitted. The cover portion 60dy is formed by increasing the length of the reinforcement flap 60dy as shown in FIG. 20(b). The length of the cover portion 60dy is substantially identical with the width of the front face portion 60a. The cover portion 60dy can be turned so that the tip end of the cover portion 60dy is placed on the reinforcement flap 60cy as shown in FIG. 21(b). Such a structure permits to increase further the strength of the unfolded sleeve 60M3. The connection portion of the cover portion 60dy with the side face portion 60d is provided with a line of perforations so that the cover portion 60dy can easily be detached from the side face portion 60d. Finger holes 60dya, 60dyb are formed on the cover portion 60dy to facilitate detachment thereof from the side face portion 60d.

There may be provided a cover, which is formed separately from the sleeve and has an inverse U-shape so as to be inserted into the sleeve, in replacement of the above-described detachable cover portion 60dy.

Figure 22:
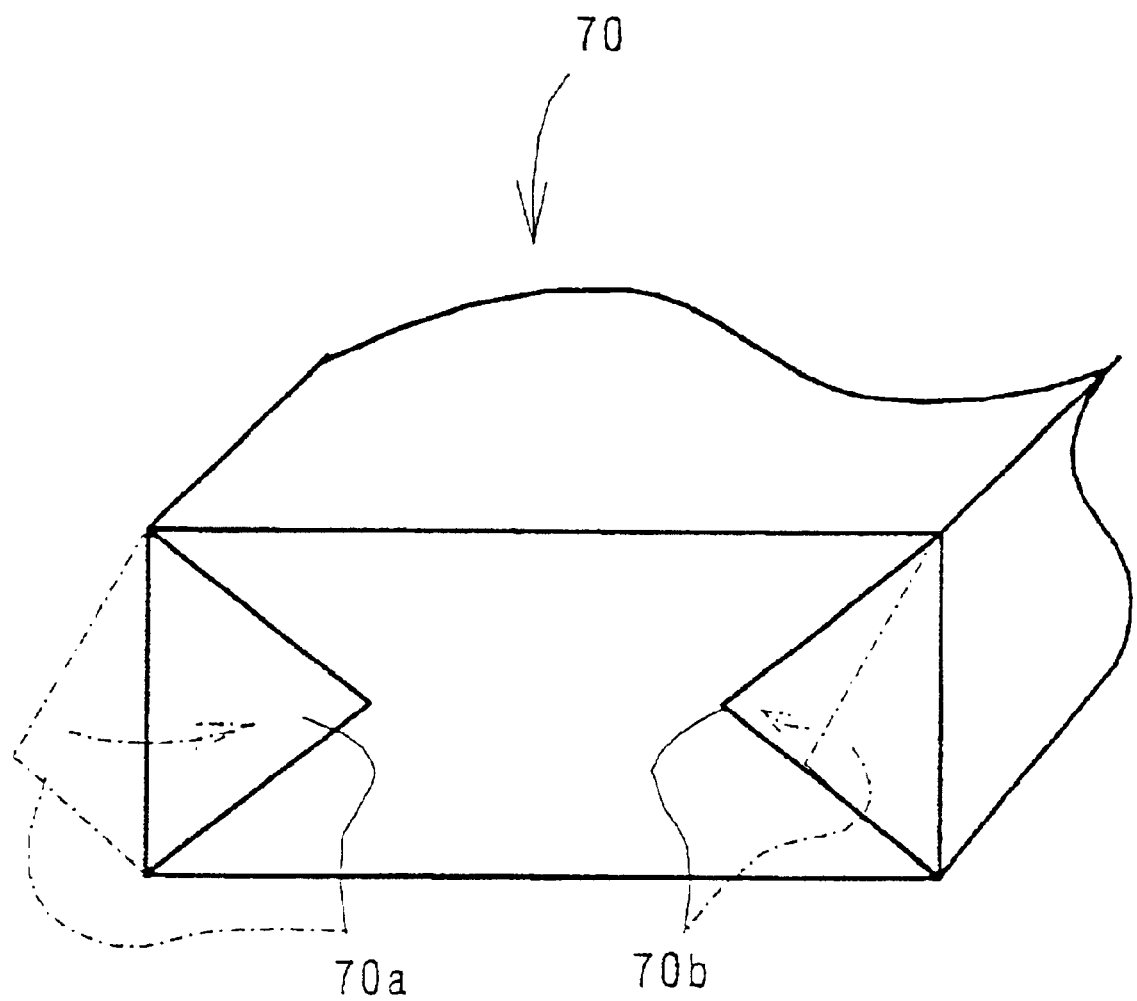
FIG. 22 is a perspective view illustrating an example of a bottom-formation method used in the reclosable packaging bag of the present invention.

In the above-described embodiments of the method for manufacturing the reclosable packaging bag, the bottom of the reclosable packaging bag having a stackable rectangular parallelepiped shape is formed by bending the flap portions 70a, 70b inward as shown in FIG. 22. When a co-extrusion film or the like, which has a heat-sealing property, is used as the sheet of film material, it is possible to prevent the flap portions 70a, 70b from projecting downward by applying an easy heating treatment to the bottom of the reclosable packaging bag.

Figure 23A:
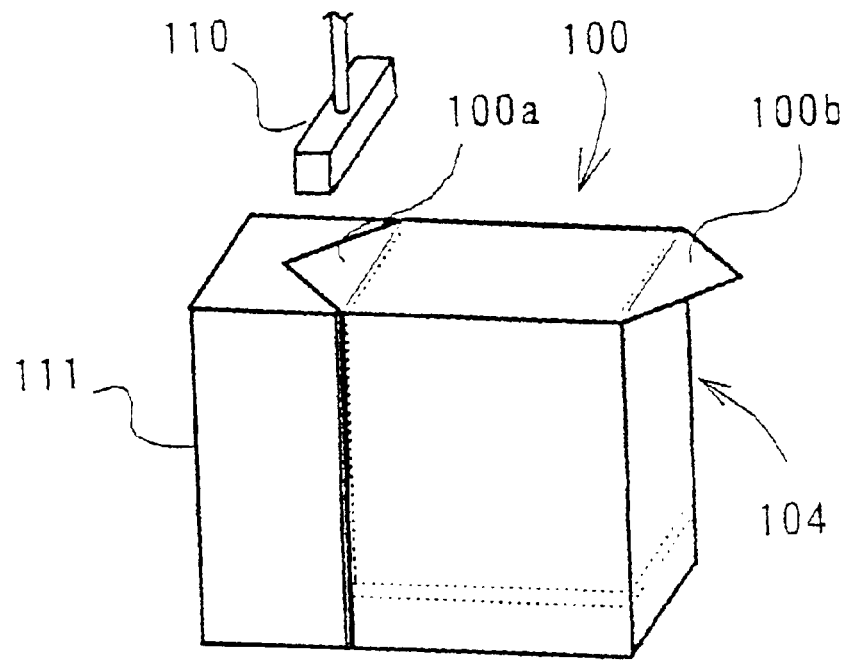
FIGS. 23A & 23B is a perspective view illustrating another example of a bottom-formation method used in the reclosable packaging bag of the present invention.

FIGS. 23 and 24 illustrate a modified formation method of the bottom of the reclosable packaging bag 100. The modified formation method comprises the steps of subjecting flap portions 100a, 100b of the main bag body 104 to a heat-sealing process and cutting off the tip end portions of them.

Figure 23B:
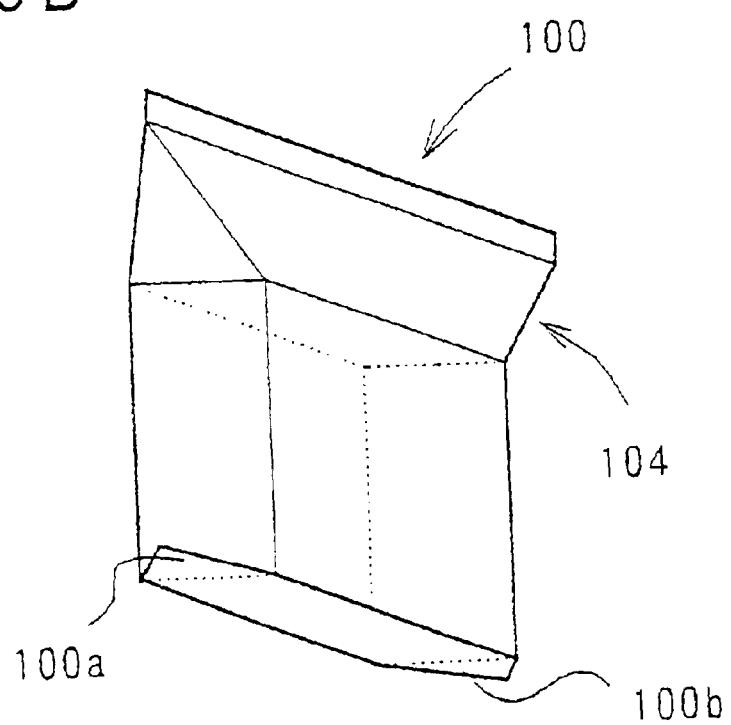
Figure 24A:
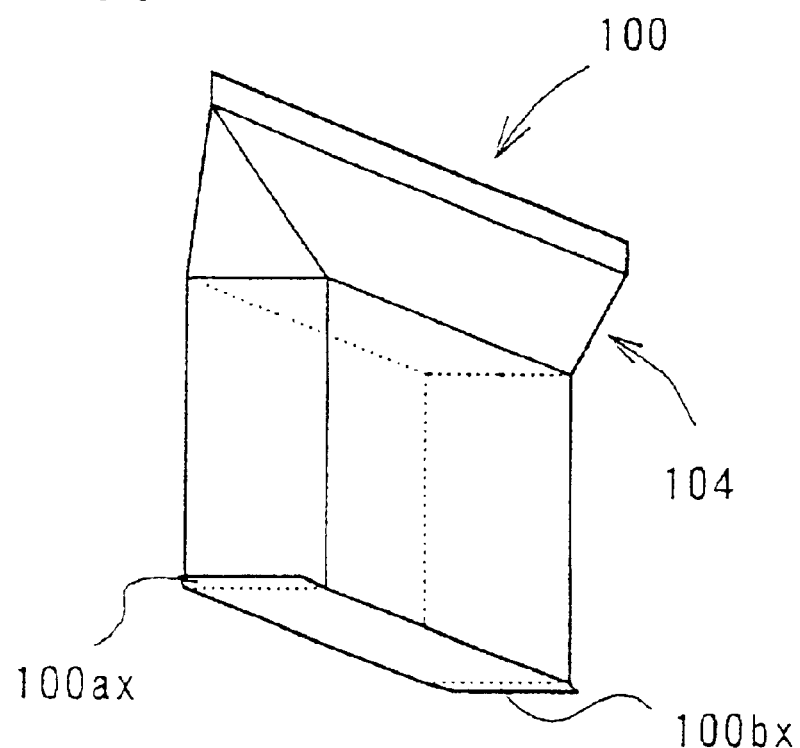
FIGS. 24A & 24B is a view illustrating the bottom of the reclosable packaging bag, which is obtained by the example of the bottom-formation method as shown in FIG. 23.
Figure 24B:
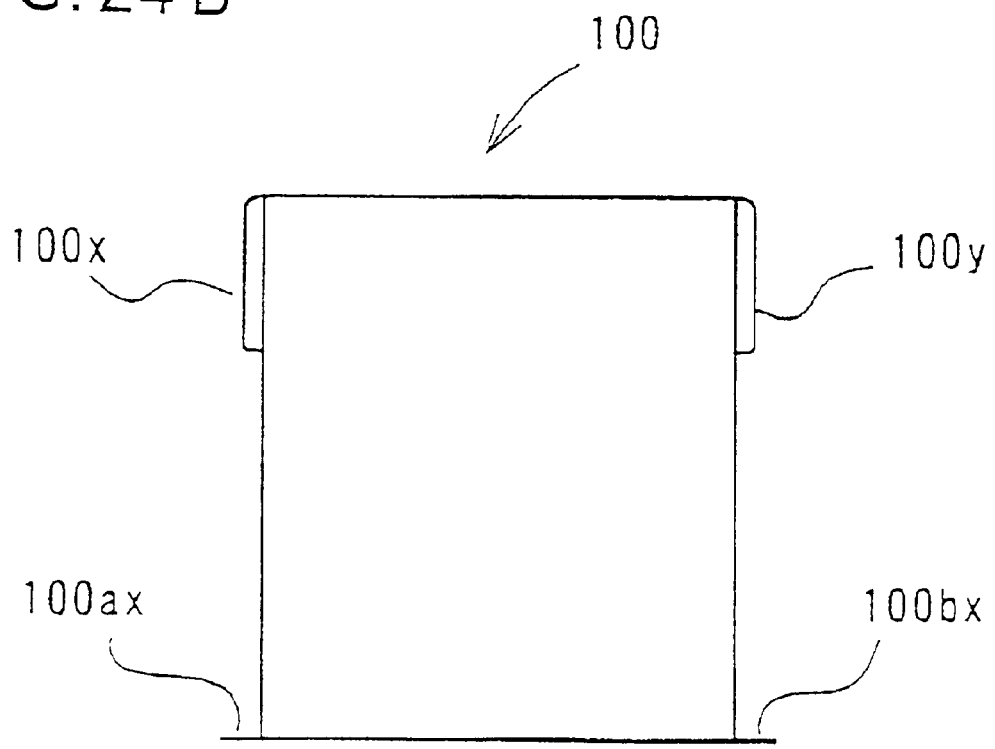
Figure 25:
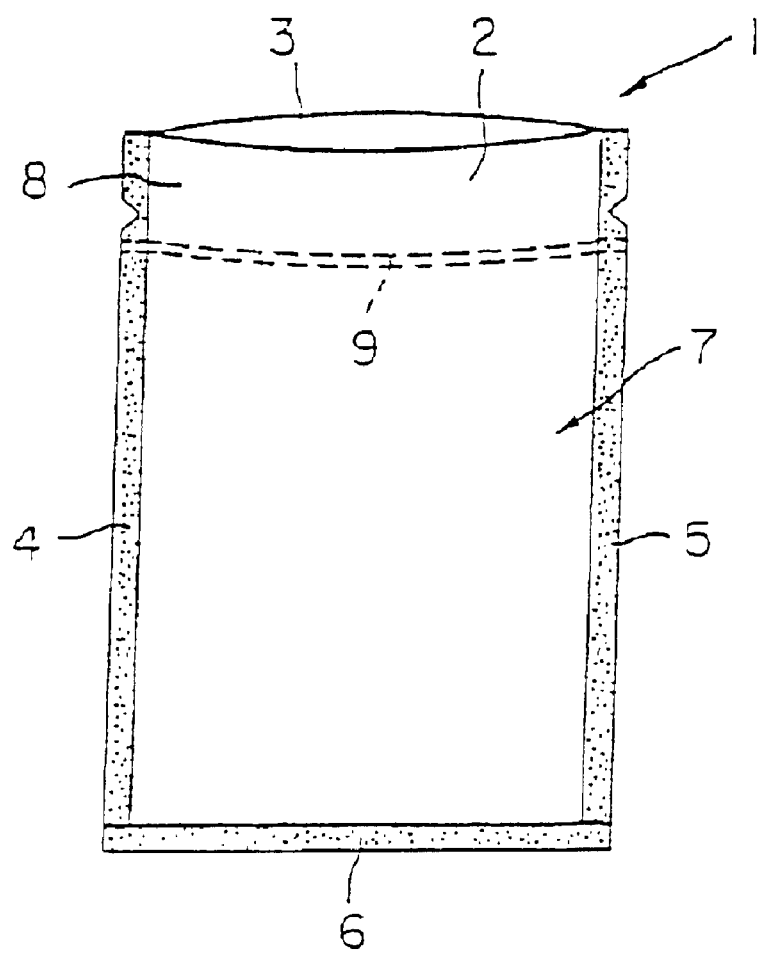
FIG. 25 is a plan view of the conventional reclosable packaging bag.

More specifically, the flap portion 100a of the main bag body 104 is placed on a base 111 and a heat-sealing head 110 is pressed on the flap portion 100a to achieve the heat-sealing process. The heat-sealing process is applied to the other flap portion 100b of the main bag body 104 in the same manner. The heat-sealed flap portions 100a, 100b are provided in this manner as shown in FIG. 23(b). Then, the tip end portions of the heat-sealed flap portions 100a, 100b are cut off as shown in FIG. 24(a) to form small flaps 100ax, 100bx. FIG. 24(b) is a schematic view illustrating the reclosable packaging bag 100, the shape of which is changed into a rectangular parallelepiped. In FIG. 24(b), reference numerals "100x, 100y" denote upper flap portions of the reclosable packaging bag 100, which are kept in a folded state. In such a reclosable packaging bag 100, there is not required any step for folding the flap portions inward as shown in FIG. 10. In addition, the small flaps 100ax, 100bx improve the self-standing property of the bag 100. The small flaps 100ax, 100bx may however be folded inward as shown in FIG. 10.

In the above-described embodiments of the present invention, the linear fastener may have a slider that is movable along the linear fastener so as to open or close the opening portion of the main bag body. The sleeve may have at lease one portion, which is joined to the main bag body by a suitable joining means such as adhesive, heat-sealing or the like. The shape of projections of the sleeve is not limited only to a triangle, but may be a trapezoid.

According to the present invention described above, the linear fastener is provided along the opening portion of the main bag body by the insert injection molding so as not to extend to the heat sealed portions. It is therefore possible to reduce the period of time for process and improve the processing efficiency.

When the main bag body includes the sleeve for keeping the prescribed shape of the main bag body, it is possible to change easily the main bag body into a proper three-dimensional shape. In addition, it is also possible to impart an appropriate strength to the three-dimensional main bag body so as to bear sufficiently the stacking load.

Provision of the easily bendable portion on the linear fastener facilitates the folding of the main bag body, so as to make it possible to prevent the occurrence of unseemly outward projection of the bent portions, thus providing a nice-looking appearance of the three-dimensional main bag body.

What is claimed is:

1. A reclosable packaging bag comprising:
   a main bag body having a substantially rectangular shape including a first pair of opposing sides and a second pair of opposing sides, said main bag body having an opening portion provided at one of said first pair of opposing sides and a pair of heat-sealed portions provided at said second pair of opposing sides, said main bag body consisting of a pair of opposite face portions formed of a single sheet material that is folded in two along a folding line, said folding line being positioned opposite said first pair of opposite sides and when the main bag body is folded along said folding line; and
   a linear fastener provided on said opening portion of said main bag body,
   said linear fastener being provided along said opening portion of said main bag body by an insert injection molding, each of said heat-sealed portions having a zone that is located adjacent to each of opposite ends of said linear fastener on an extension line thereof, each said zone being free of material of which said linear fastener is formed.

2. The reclosable packaging bag as claimed in claim 1, wherein:
   said heat sealed portion is provided on each of opposite sides of said main bag body.

3. The reclosable packaging bag as claimed in claim 1, wherein:
   said heat sealed portion is provided on one of a pair of opposing faces of said main bag body.

4. The reclosable packaging bag as claimed in claim 3, wherein:
   said heat-sealed portion is provided on a middle portion of said one of said pair of opposing faces.

5. A reclosable packaging bag comprising:
   a main bag body having on an upper side thereof an opening portion, said main bag body consisting of a pair of opposite foldable sheets;
   a linear fastener provided on said opening portion of said main body so as to extend in a horizontal direction, said linear fastener having a predetermined length; and
   a sleeve placed in said main bag body in a generally flat collapsed state in which substantially an entire outer surface of said sleeve contacts an inner surface of said main bag body, said sleeve being structured to be unfolded within said main bag body enabling the sleeve and main bag body to be shifted between the generally flat collapsed state and an expanded state defining with said main body volume within the sleeve and main bag body, while maintaining contact between the outer surface of the sleeve and the inner surface of the main bag body, said sleeve having a substantially open bottom in the expanded state, wherein the sleeve is positioned within the main bag body such that lowermost edges of front and rear walls of the sleeve are spaced upwardly away from a bottom edge of the main bag body in the collapsed state.

6. A bag according to claim 5 wherein said sleeve has (i) a first face portion having a rectangular shape, (ii) a second face portion facing said first face portion and having substantially a same shape and size as said first face portion, (iii) a third face portion connecting corresponding side edges on one side of said first and second face portions to each other and having a rectangular shape, and (iv) a fourth face portion connecting corresponding side edges on another side of said first and second face portions to each other and having substantially a same shape and size as those of said third face portion.

7. A bag according to claim 6 wherein each of said third and fourth face portions is foldable in two along a vertical center line thereof so that said vertical center line projects outward from the side edges of said first and second face portions in the collapsed state of said sleeve, and lies placed between the corresponding side edges of said first and second face portions in the expanded state of said sleeve.

8. A bag according to claim 7 wherein a horizontal distance between the vertical center line of the third face portion and the vertical center line of the fourth face portion in the collapsed state of said sleeve is substantially identical with the predetermined length of said linear fastener.

9. A bag according to claim 5, wherein said sleeve is adhered on the inner surface of said main bag body.

10. A bag according to claim 5, wherein the sleeve includes front, rear and a pair of lateral side walls together defining a substantially rectangular structure in the expanded state, said substantially rectangular structure having a substantially open bottom in the expanded state.

11. A bag according to claim 5, wherein said linear fastener includes at least one discrete portion that is more easily bendable relative to the other portions of the linear fastener to facilitate folding of the main bag body into a predetermined shape.

12. A method for manufacturing a reclosable packaging bag comprising:
   providing a main bag body having a substantially rectangular shape including a first pair of opposing sides and a second pair of opposing sides, said main bag body having an opening portion provided at one of said first pair of opposing sides and a pair of heat-sealed portions provided at said second pair of opposing sides, said main bag body consisting of a pair of opposite face portions formed of a single sheet material that is folded in two along a folding line, said folding line being positioned opposite said first pair of opposite sides and when the main bag body is folded along said folding line;
   providing a linear fastener provided on said opening portion of said main bag body; and
   providing said linear fastener along said opening portion of said main bag body by an insert injection molding, each of said beat-sealed portions having a zone that is located adjacent to each of opposite ends of said linear fastener on an extension line thereof, each said zone being free of material of which said linear fastener is formed.

13. A method for manufacturing a reclosable packaging bag comprising:
   providing a main bag body having on an upper side thereof an opening portion, said main bag body consisting of a pair of opposite foldable sheets;
   providing a linear fastener provided on said opening portion of said main body so as to extend in a horizontal direction, said linear fastener having a predetermined length;
   providing a sleeve placed in said main bag body in a generally flat collapsed state in which substantially an entire outer surface of said sleeve contacts an inner surface of said main bag body, said sleeve being structured to be unfolded within said main bag body enabling the sleeve and main bag body to be shifted between the generally flat collapsed state and an expanded state defining with said main body volume within the sleeve and main bag body, while maintaining contact between the outer surface of the sleeve and the inner surface of the main bag body, said sleeve having a substantially open bottom in the expanded state; and positioning the sleeve within the main bag body such that lowermost edges of front and rear walls of the sleeve are spaced upwardly away from a bottom edge of the main bag body in the collapsed state.

14. The method according to claim 13, further comprising providing said sleeve with (i) a first face portion having a rectangular shape, (ii) a second face portion facing said first face portion and having substantially a same shape and size as said first face portion, (iii) a third face portion connecting corresponding side edges on one side of said first and second face portions to each ocher and having a rectangular shape, and (iv) a fourth face portion connecting corresponding side edges on another side of said first and second face portions to each other and having substantially a same shape and size as those of said third face portion.

15. The method according to claim 14 wherein each of said third and fourth face portions is foldable in two along a vertical center line thereof so that said vertical center line projects outward from the side edges of said first and second face portions in the collapsed state of said sleeve, and lies placed between the corresponding side edges of said first and second face portions in the expanded state of said sleeve.

16. The method according to claim 15 wherein a horizontal distance between the vertical center line of the third face portion and the vertical center line of the fourth face portion in the collapsed state of said sleeve is substantially identical with the predetermined length of said linear fastener.

17. The method according to claim 14, further comprising adhering said sleeve on the inner surface of said main bag body.

18. A reclosable packaging bag comprising:

a main bag body having on an upper side thereof an opening portion, said main bag body including a pair of opposite sheets;

a linear fastener provided on said opening portion of said main body so as to extend in a horizontal direction, said linear fastener having a predetermined length; and a sleeve placed in said main bag body in a generally flat collapsed state in which substantially an entire outer surface of said sleeve contacts an inner surface of said main bag body, said sleeve being structured to be unfolded within said main bag body enabling the sleeve and main bag body to be shifted between the generally flat collapsed state and an expanded state defining with said main body volume within the sleeve and main bag body, while maintaining contact between the outer surface of the sleeve and the inner surface of the main bag body, wherein the sleeve is positioned within the main bag body such that lowermost edges of front and rear walls of the sleeve are spaced upwardly away from a bottom edge of the main bag body in the collapsed state, and the sleeve includes a pair of lateral side walls that together with the front and rear walls define a substantially rectangular structure in the expanded state, said substantially rectangular structure having a substantially open bottom in the expanded state.

19. A bag according to claim 11, wherein said linear fastener includes at least one discrete portion that is more easily bendable relative to the other portions of the linear fastener to facilitate folding of the main bag body into a predetermined shape.

* * * * *